United States Patent [19]
Lorenz et al.

[11] Patent Number: 5,293,170
[45] Date of Patent: * Mar. 8, 1994

[54] GLOBAL POSITIONING SYSTEM RECEIVER DIGITAL PROCESSING TECHNIQUE

[75] Inventors: Robert G. Lorenz, Newark; Roger J. Helkey, Goleta; Kamran K. Abadi, Menlo Park, all of Calif.

[73] Assignee: Ashtech Inc., Sunnyvale, Calif.

[*] Notice: The portion of the term of this patent subsequent to Jul. 28, 2009 has been disclaimed.

[21] Appl. No.: 864,461

[22] Filed: Apr. 6, 1992

Related U.S. Application Data

[63] Continuation of Ser. No. 683,608, Apr. 10, 1991, Pat. No. 5,134,407.

[51] Int. Cl.$^5$ .................... H04B 7/185; G01S 5/02; H03D 3/18
[52] U.S. Cl. .................... 342/352; 342/357; 455/81
[58] Field of Search .................... 342/352, 357, 356; 375/80, 81, 82, 96, 118

[56] References Cited

U.S. PATENT DOCUMENTS

| | | | |
|---|---|---|---|
| 4,426,712 | 1/1984 | Gorski-Popiel | 375/96 |
| 4,445,118 | 4/1984 | Taylor et al. | 342/375 |
| 4,463,357 | 7/1984 | MacDoran | 342/460 |
| 4,613,977 | 9/1986 | Wong et al. | 375/97 |
| 4,667,203 | 5/1987 | Counselman, III | 342/357 |
| 4,672,629 | 6/1987 | Beier | 375/1 |
| 4,797,677 | 1/1989 | MacDoran | 342/352 |
| 4,821,294 | 4/1989 | Thomas | 375/96 |
| 4,894,662 | 1/1990 | Counselman, III | 342/357 |
| 4,928,106 | 5/1990 | Ashjaee et al. | 342/352 |
| 4,972,431 | 11/1990 | Keegan | 375/1 |
| 5,134,407 | 7/1992 | Lorenz et al. | 342/352 |

FOREIGN PATENT DOCUMENTS

0430364A2 11/1990 European Pat. Off. .

OTHER PUBLICATIONS

"Interface Control Document" of Rockwell International Corporation, entitled Navstar GPS Space Segment/Navigation User Interfaces, dated Sep. 26, 1984, as revised Dec. 19, 1986, also referred to as the ICD-GPS-200.

*Primary Examiner*—Gregory C. Issing
*Attorney, Agent, or Firm*—Majestic, Parsons, Siebert & Hsue

[57] ABSTRACT

A Global Positioning System (GPS) commercial receiver is provided with a digital processor that can utilize to advantage P-code modulated L1 and L2 satellite signals which have been modulated with an unknown security code. Integration of the L1 and L2 signals, after demodulation by locally generated carrier and P-code signals, is repetitively accomplished over a duration that is estimated to be the period of the modulation code. The C/A-code L1 signal, which is not modulated with the unknown security code, is also used in locking the locally generated carrier and P-code generators in phase with the received L1 and L2 satellite signals. A interpolative technique is used for adjusting the phase of the locally generated carriers and code in increments much smaller than the period clock sources. Those locked phases can then be utilized to determine position, distance, time, etc., as is done in GPS receivers not utilizing the anti-spoofed signals but with increased accuracy and resolution. A novel structure of the GPS receiver radio frequency and intermediate frequency sections, having a specific combination of demodulating frequencies, is also disclosed.

44 Claims, 17 Drawing Sheets

GLOBAL POSITIONING SYSTEM RECEIVER DIGITAL PROCESSING TECHNIQUE

This is a continuation of application Ser. No. 07/683,608, filed Apr. 10, 1991, now U.S. Pat. No. 5,134,407.

BACKGROUND OF THE INVENTION

This invention relates generally to global positioning system ("GPS") satellite signal receivers, and, more particularly, to improvements in their digital processing sections.

The United States government is in the process of placing into orbit a number of satellites as part of a global positioning system (GPS). Some of the satellites are already in place. A receiver of signals from several such satellites can determine very accurately parameters such position, velocity, and time. There are both military and commercial uses. A primary military use is for a receiver in an aircraft or ship to constantly determine the position and velocity of the plane or ship. An example commercial use includes accurate determination of the location of a fixed point or a distance between two fixed points, with a high degree of accuracy. Another example is the generation of a high accuracy timing reference.

In order to accomplish this, each satellite continually transmits two L-band signals. A receiver simultaneously detects the signals from several satellites and processes them to extract information from the signals in order to calculate the desired parameters such as position, velocity or time. The United States government has adopted standards for these satellite transmissions so that others may utilize the satellite signals by building receivers for specific purposes. The satellite transmission standards are discussed in many technical articles and are set forth in detail by an "Interface Control Document" of Rockwell International Corporation, entitled "Navstar GPS Space Segment/Navigation User Interfaces", dated Sep. 26, 1984, as revised Dec. 19, 1986, hereinafter referred to as the "ICD-GPS-200".

Briefly, each satellite transmits an L1 signal on a 1575.42 MHz carrier, usually expressed as 154 f0, where f0=10.23 MHz. A second L2 signal transmitted by each satellite has a carrier frequency of 1227.6 MHz, or 120 f0. Each of these carrier signals is modulated in the satellite by at least one pseudo-random signal function that is unique to that satellite. This results in developing a spread spectrum signal that resists the effects of radio frequency noise or intentional jamming. It also allows the L-band signals from a number of satellites to be individually identified and separated in a receiver.

One such pseudo-random function is a precision code ("P-code") that modulates both of the L1 and L2 carriers in the satellite. The P-code has a 10.23 MHz clock rate and thus causes the L1 and L2 signals to have a 20.46 MHz bandwidth. The P-code is seven days in length. In addition, the L1 signal of each satellite includes a carrier in phase quadrature with the P-code carrier that is modulated by a second pseudo-random function. This second modulating function is a unique clear acquisition code ("C/A-code") having a 1.023 MHz clock rate and repeating its pattern every one millisecond, thus containing 1023 bits. Further, the L1 carrier is also modulated by a 50 bit-per-second navigational data stream that provides certain information of satellite position, status and the like.

In a receiver, signals corresponding to the known pseudo-random P-code and C/A-code may be generated in the same manner as they are in the satellites. The L1 and L2 signals from a given satellite are demodulated by aligning the phases of the locally generated codes with those modulated onto the signals from that satellite. The relative phases of the two carriers may then be determined. The carrier signal phases and pseudo-range measurements from a number of satellites are measurements that are used by a receiver to calculate the desired end quantities of distance, velocity, time, etc. The apparent transmission time of the signals from a given satellite to the GPS receiver can be measured, from which an apparent range to that satellite may be computed.

The C/A-code modulated phase quadrature carrier component of the L1 signal is provided for commercial use. If the accuracy desired in the quantity being measured by the receiver is not great, use of the L1 signal carrier alone is satisfactory. However, for applications where high resolution measurements are desired to be made, and/or the measurements must be made quickly, the L2 carrier must also be used. The measurement becomes more accurate by eliminating an unknown delay of the signals by the ionosphere when both of the L1 and L2 signal carriers are used.

Although the P-code functions of all the satellites are also known, the satellites are provided with means to modulate the P-code with a secret signal in order to prevent jamming signals from being accepted as actual satellite signals. This "anti-spoofing" allows the GPS system to be used for military or other sensitive United States Government applications. The secret modulating signal, often referred to as the "A-S code" and designated herein for convenience as the "A-code", may be turned on or off at will by the United States government. When on, according to the ICD-GPS-200, the P-code is replaced by a Y-code on both the L1 and L2 carriers. It has been disclosed publicly that the Y-code is the modulo-two sum of the known P-code and the unknown A-code. In order to be able to extract the carrier from an anti-spoofed L2 signal by the straightforward demodulating technique described above, the Y-code or A-code would have to be known. Since the A-code is classified by the United States Government, such L2 signal demodulation cannot be accomplished by commercial GPS receiver manufacturers or users.

As a result, other techniques have been suggested to obtain the L2 signal carrier. One such "codeless" technique is to square the received L2 signal, thus eliminating its modulating terms. This is utilized in the receiver described in U.S. Pat. No. 4,928,106—Ashjaee et al (1990). Although satisfactory for many applications, the squaring of the spread spectrum signal causes the signal-to-noise ratio to be degraded. Alternatively, the modulation may be removed by multiplying the upper and lower sidebands of the L2 carrier signal as described in U.S. Pat. No. 4,667,203—Counselman (1987).

In order to reduce this signal-to-noise degradation, it has also been suggested to adjust the phase of a locally generated replica of the known P-code until a strong demodulated signal appears out of the noise. This narrower bandwidth signal is then squared in order to eliminate the unknown modulation without hurting the signal-to-noise level as much as when the entire L2 signal is squared. Such a technique is described in U.S. Pat. No. 4,972,431—Keegan (1990).

However, the technique described in the Keegan patent results in a half wavelength L2 carrier phase observable, making it more difficult to quickly resolve integer ambiguities. Also, the signal-to-noise ratio resulting from the technique of the Keegan patent is not optimal. It is, therefore, a primary object of this invention to provide a technique of processing GPS satellite signals that overcomes these limitations.

It is a more general object of the present invention to provide a technique for using carrier signals modulated by the anti-spoofing A-code without having to know the A-code.

It is another object of the present invention to provide a technique of determining relative phases of GPS satellite signals with an increased degree of resolution.

It is a further object of the present invention to provide an improved radio frequency front end section for a GPS receiver.

SUMMARY OF THE INVENTION

This and additional objects are realized by the present invention, wherein, briefly and generally, according to one aspect thereof, received L1 and L2 signals are processed to provide an estimate of the unknown A-code modulation signal which is then removed from the received signals to a degree necessary to allow local oscillators and locally generated code replicas to be locked in phase with the L1 and L2 P-code signals. This is accomplished by extracting an estimate of the A-code from the L1 signal and then multiplying the L2 signal by this estimate, thereby reducing the effect of the unknown anti-spoofing signal on the L1 signal. Similarly, an estimate of the A-code is extracted from the L2 signal and the L1 signal is then multiplied by it, thereby reducing the effect of the unknown anti-spoofing signal on the L2 signal. Although the individual A-code estimates are noisy, the signal-to-noise ratio of the resulting processed signals is still better than that achieved by squaring the L2 signal to remove the modulation of the A-code, as previously employed by others.

This technique does not require knowledge of the A-code, so can be implemented without detracting from the anti-spoofing effect brought about by modulating the satellite signals with the secret A-code. It only requires knowing some aspects of the A-code timing, not the content of the code, and such timing information be determined experimentally given the approximate timing. It is known that each of the L1 and L2 signals is modulated with the same P-code which has been modulated by the A-code function, and that the resulting Y-code is the modulo-two sum of the two. The period of the A-code is known to be equal to roughly twenty periods of the P-code. Integration of the L1 and L2 signals is accomplished, in carrying out the present invention, approximately over the period of the A-code. Although a goal is to determine the actual timing of the A-code, the techniques of the present invention do not require exact knowledge of the A-code period timing but rather operate satisfactorily with approximate timing information. This results in a form of cross-correlation of the L1 and L2 signals with some degradation in signal-to-noise ratio.

In a preferred implementation, the A-code rate estimate is obtained from a timing generator that is synchronized with an internal receiver P-code generator. The timing generator allows adjustment of the phase of its A-code timing signal output with respect to the P-code and the duration of the A-code period itself in terms of a number of P-code cycles, in order to optimize the internally generated timing signals with that of the actual unknown A-code contained in the received signals. This output is used to define the signal integration periods in the receiver processing.

According to another aspect of the present invention, the known L1 signal C/A-code is used to determine the phase of its carrier, thereby allowing the phase of the L1 signal P-code carrier to be determined, even though containing the unknown A-code, since the two are phased ninety degrees apart. The estimate of the A-code rate derived from the L1 signal, having the correct sign (phase), is then combined with the L2 signal in a manner to determine the L2 signal carrier phase. This allows resolution of a one-half cycle phase ambiguity that is the result of some prior techniques and thus allows a higher resolution receiver operation.

According to yet another aspect of the present invention, a single P-code generator is provided in a receiver and used with both of the received L1 and L2 signals. Each of these two received signals is modulated by the same P-code but at a different phase in order to match the P-code phase in each of the signals. The phases differ since the ionosphere delays the L1 and L2 signals differently as a function of their different frequency bands. Therefore, rather than using two P-code generators, one for the L1 signal and the other for the L2 signal, as is generally the case, the single generated P-code signal is applied to a digital delay line and outputs for use in demodulating the L1 and L2 signals are obtained at different taps of the delay line.

According to a further aspect of the present invention, the phase of a sampled version of a locally generated signal, such as a GPS P-code signal, is made to be adjustable in steps that are only a small fraction of the period of the clock from which the signal is generated. The locally generated signal and a version of it that has been delayed by a fixed amount, such as one-half of a signal clock period, are sampled by another clock signal that has a frequency slightly different than twice the signal clock frequency. The desired sampled version of the signal is obtained by switching between the sampled version of the locally generated signal and the sampled delayed version of the locally generated signal. The switching point is determined by comparison of the signal clock and the sample clock. A control pulse is generated each time the rising edge of the two clocks are substantially aligned, an event which occurs at periodic intervals separated a number of clock cycles determined by the frequency of the sample clock and the difference in frequency between twice the signal clock and the sample clock. The point of switching is set by an adjustable period of delay, such as can be implemented by a counter clocked by the sample clock and cleared by the control pulse. The relative phase of the locally generated signal is thus adjustable with fine resolution and, in one application illustrated herein, allows locking a delay locked code loop circuit onto the satellite signals with a higher degree of resolution.

The advantages of this phase adjustment technique include a great simplification of the circuitry required to implement the function and an elimination of the usual need for use of a numerically controlled oscillator or a high sampling frequency in each code loop to achieve a high degree of resolution. This technique, in combination with the use of a single P-code generator and a delay line discussed above, allows a reduction of the number and/or complexity of integrated circuits in a GPS receiver.

According to yet a further aspect of the present invention, improvements are provided in a GPS receiver front end of a type having a frequency down converter radio frequency ("R.F.") section positioned adjacent an antenna and communicating over a single coaxial cable to an intermediate frequency ("I.F.") section in the main receiver instrument. The L1 and L2 signal bands are reduced in frequency in the R.F. section by mixing with a common demodulating signal having a frequency above that of the L1 and L2 bands such that one of the L1 or L2 signals is reduced to a low frequency band and the other to a higher frequency band for travel along the cable to the I.F. stage. The higher frequency band is reduced in frequency in the I.F. stage to a band that is the same as the low frequency and. Both of the low level frequency band L1 and L2 signals are then reduced in the I.F. section to a baseband by a common mixing oscillator, and the result is digitized for application to the digital channel processors.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 16(A)-(J) are waveforms that show the operation of the interpolator circuit of FIG. 15;

DESCRIPTION OF A PREFERRED EMBODIMENT

The preferred global positioning system (GPS) receiver embodiment utilizing the various aspects of the present invention is described in sections with respect to the drawings.

Overall Receiver Architecture

Figure 1:
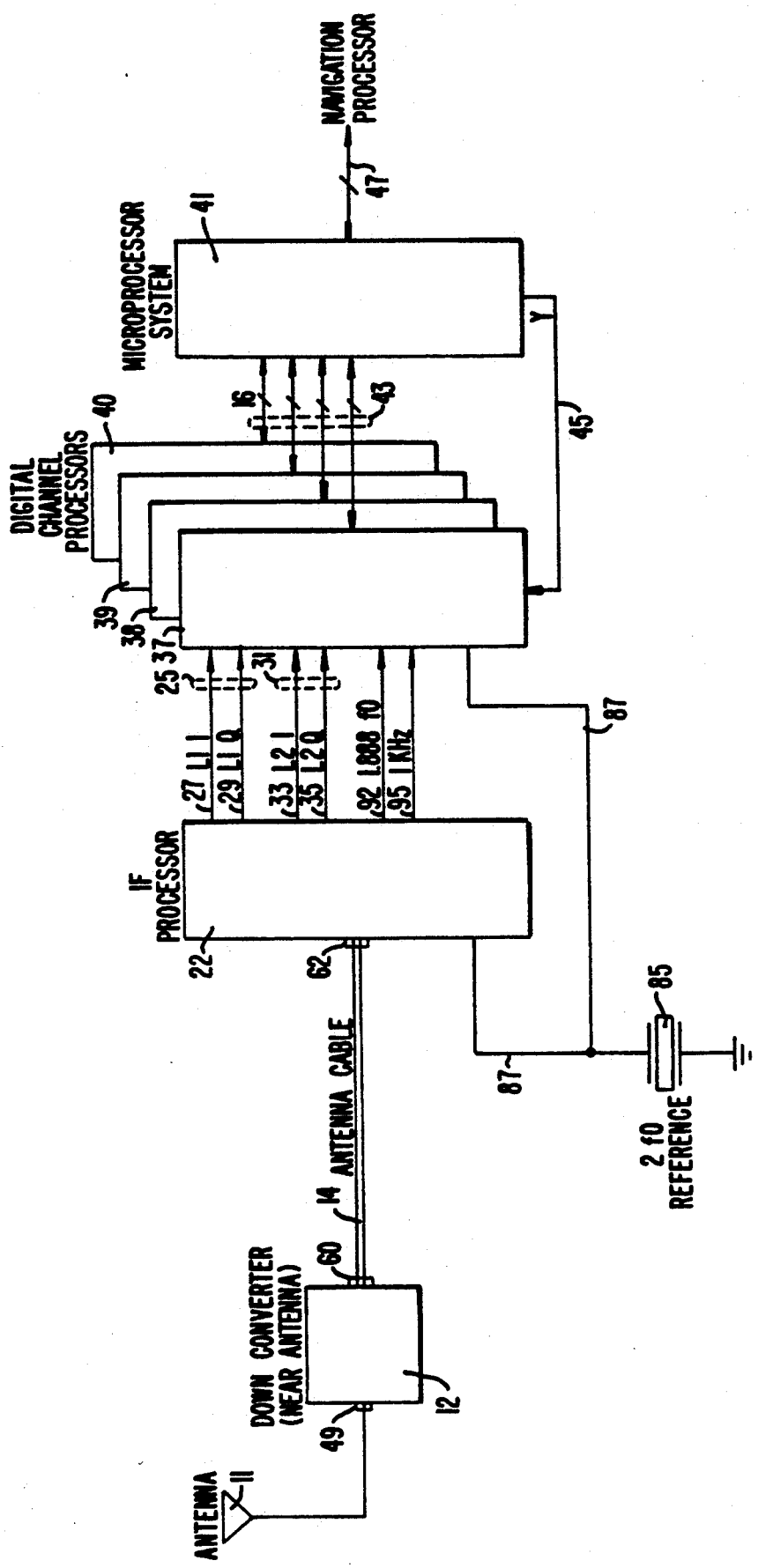
FIG. 1 is an overall system diagram of a GPS receiver that utilizes the various aspects of the present invention.

Referring initially to FIG. 1, a signal received from an antenna 11 is initially applied to a down converter 12 containing an R.F. section for the receiver and physically located very near the antenna. I.F. signals from the down converter 12 are communicated over an antenna cable 14 to an I.F. processor 22 of the receiver instrument itself. The I.F. processor 22 includes an intermediate frequency section and analog-to-digital converters. The I.F. processor 22 outputs in circuits 25 phase quadrature digital representations of the L1 band satellite signals in lines 27 and 29. That is, digitized L1 signals exist in both the lines 27 and 29, but are shifted in phase by ninety degrees from each other. Similarly, output circuits 31 from the I.F. processor 22 provide digitized L2 signals in circuits 31 in phase quadrature in lines 33 and 35. By providing digitized signals in phase quadrature, unambiguous decoding of those signals is made possible.

The L1 and L2 band signal outputs of the I.F. processor 22 are applied to a plurality of digital channel processors 37, 38, 39, 40 . . . . Enough such processors are provided in order that, at any one time, there is a separate processor for each satellite whose signal is being used. Signals from at least three satellites are generally used, and more commonly, four or more satellite signals are simultaneously processed in order to calculate the ultimate desired quantity, such as distance, position, time, etc. Each of the digital channel processors 37–40 identifies from the outputs of the I.F. processor 22 those signals from a given single satellite by matching an internally generated code with that satellite's unique C/A-code and/or P-code.

Since all of the digital channel processors are otherwise the same, only one processor 37 is described further herein as exemplary. Information determined about the L1 and L2 carriers from a single satellite is communicated with a dedicated microprocessor system 41 over a bus 43. The microprocessor system generally controls the operation of the digital channel processors, one control circuit 45 being indicated since it is discussed later. The micro-processor system 41 communicates over a bus 47 with a host navigational processor that makes calculations from the carrier and code phase information provided for signals from a plurality of satellites of the ultimate quantity to be determined.

Receiver Front End R.F. and I.F. Sections

Figure 2:
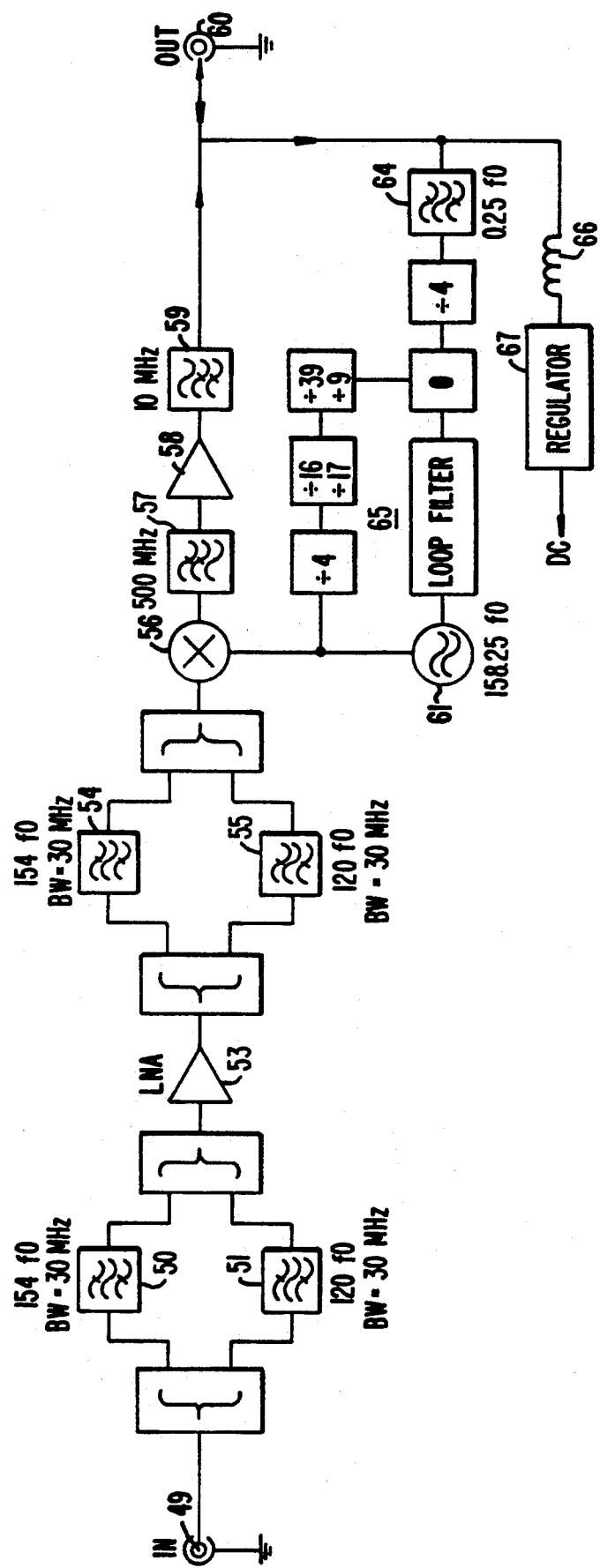
FIG. 2 shows the circuit configuration of the down converter portion of the system of FIG. 1.

Referring to FIG. 2, the R.F. processing of the down converter 12 is shown. The antenna 11 is electrically connected to an input jack 49 and the signal is applied to bandpass filters 50 and 51 to separate out of the received signals those within the L1 and L2 satellite signal bands. A bandpass of about 30 MHz is provided by each of these two filters. The filter 50 has its band centered at the L1 signal carrier frequency of 154 f0, where f0 equals 10.23 MHz. Similarly, the bandpass filter 51 has a center frequency of its pass band equal to that of the L2 carrier, namely 120 f0. The outputs of these filters are combined and amplified by a low noise amplifier 53, and then applied to a similar pair of bandpass filters 54 and 55 with generally the same characteristics as the bandpass filters 50 and 51, respectively. The second set of filters is provided to further eliminate the image response and image noise.

A combined output of the bandpass filters 54 and 55 is then reduced in frequency by a mixer 56 whose output is applied in series to a low pass filter 57, an amplifier 58, and a high pass filter 59 in order to provide I.F. frequency signals at an output jack 60. The mixer 56 receives a demodulating signal of 158.25 f0 from a voltage controlled oscillator 61. Thus, the center frequency of the L1 signals at an output of the mixer 56 applied to the filter 57 is reduced to 4.25 f0. Similarly, the center frequency of the L2 signals is reduced to 38.25 f0. Since both of these signals are being carried in a single communications channel, they must be maintained at different frequencies so they can later be separated. The low pass filter 57 has a upper pass band of about 500 MHz and is provided to limit the high frequency response of the mixer 56 output.

Figure 3:
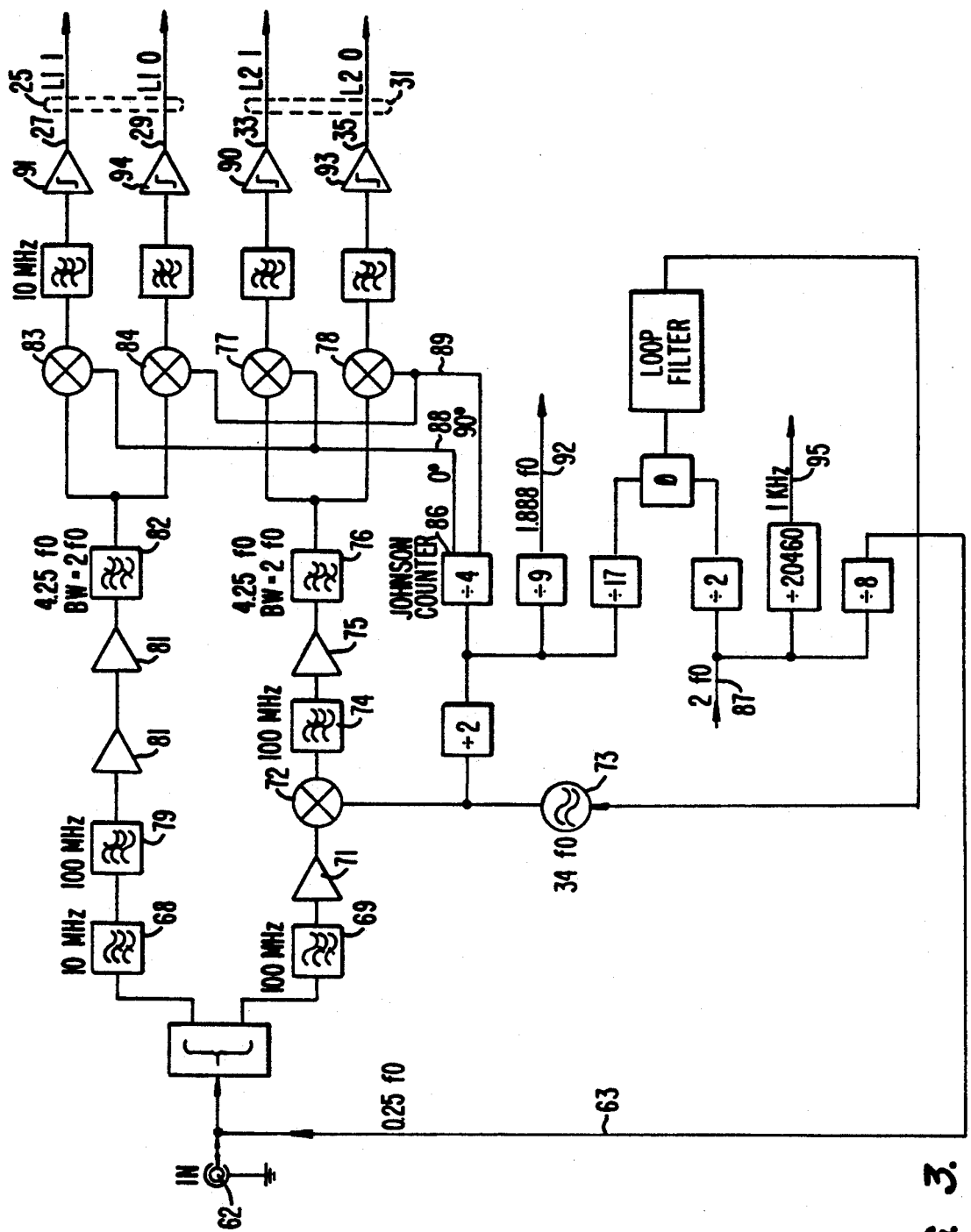
FIG. 3 shows the circuit configuration of the I.F. processor portion of the system of FIG. 1.

The output jack 60 of the down converter is connected by the antenna cable 14 to an input jack 62 of the I.F. processor shown in FIG. 3. Included in the I.F. processor are clock and timing circuits. Since a reference clock signal is required for the voltage controlled oscillator 61 of the down converter of FIG. 2, a clock signal of 0.25 f0 is connected by a line 63 to the jack 62. That signal is then present at the output jack 60 of the down converter. This reference clock signal is separated from the others at the jack 60 by a bandpass filter 64 having a center frequency at 0.25 f0. In order to isolate this clock reference signal from the intermediate frequency amplifier 58, the high pass filter 59 blocks from being transmitted through it anything below 10 MHz.

The 0.25 f0 reference clock signal at the output of the filter 64 serves as a reference for a phase-locked-loop 65 in order to maintain the output of the voltage controlled oscillator 61 at 158.25 f0. In addition to this reference clock signal, power is also sent to the down converter 12 over the antenna cable 14, this direct current ("D.C."), zero frequency signal being separated from those at the jack 60 by a choke inductor 66 and applied to a regulator 67 in order to provide the D.C. supply required by the electronic components of the down converter.

Referring to FIG. 3, the intermediate frequency L1 and L2 band signals applied to the jack 62 are simultaneously inputted to high pass filters 68 and 69. The filter 68 is the first element of a path that selects and processes the L1 band signals. The filter 69 is the first element in the path that selects and processes the L2 band signals. The filter 69 cuts off all frequencies below 100 MHz, and thus eliminates the L1 band signals from that path. The L2 band signals are then amplified by an amplifier 71 and reduced in frequency at a mixing stage 72. A frequency of 34 f0 from a voltage controlled oscillator 73 is mixed with the 38.25 f0 L2 signal band, and then passed through a low pass filter 74 with a 100 MHz cutoff in order to eliminate the undesired sideband resulting from the mixing. An amplifier 75 receives that signal and passed it through a SAW bandpass filter 76 to two mixing stages 77 and 78.

Since the L1 signal has already been reduced in the down converter 12 to a frequency band with a center of 4.25 f0, no mixer is necessary in the signal path that begins with the high pass filter 68. The filter 68 cuts off all frequencies under 10 MHz and serves a function to eliminate the 0.25 f0 signal in line 63 from passing down this signal path. A subsequent low pass filter 79 has a purpose of blocking the L2 band signals from this signal path, cutting off all frequencies in excess of 100 MHz. The output of the filter 79 is then passed through a pair of amplifiers 81 to a SAW filter 82 of the same type as the filter 76. The output of the filter 82 is applied to two mixing stages 83 and 84.

A number of synchronous clock signals are developed in the I.F. processor of FIG. 3 by a series of dividers connected to the 34 f0 output of the voltage controlled oscillator 73. That frequency output is fixed by use of a standard phase-locked-loop that is driven from the clock reference 85 at a frequency 2 f0 through a line 87. A principal clock signal used in other portions of the receiver described hereinafter is the 1.888 f0 signal in line 92. Another is the 1 KHz signal in line 95.

A Johnson counter 86 is one of the dividers in this clock circuit and is unique in having two outputs in phase quadrature, an output of zero degrees relative phase in a line 88 and one of ninety degrees relative phase in a line 89. The frequency of these clock signals is 4.25 f0. The zero degree relative phase signal is applied to mixers 83 and 77 whose outputs are passed through individual low pass filters and then connected to respective one bit analog-to-digital converters 90 and 91. Similarly, the ninety degree relative phase clock signal in the line 89 is applied to the mixers 78 and 84, whose outputs are then passed through individual low pass filters and then digitized by respective one bit analog-to-digital converters 93 and 94.

Overview of Digital Channel Processors

Figure 4:
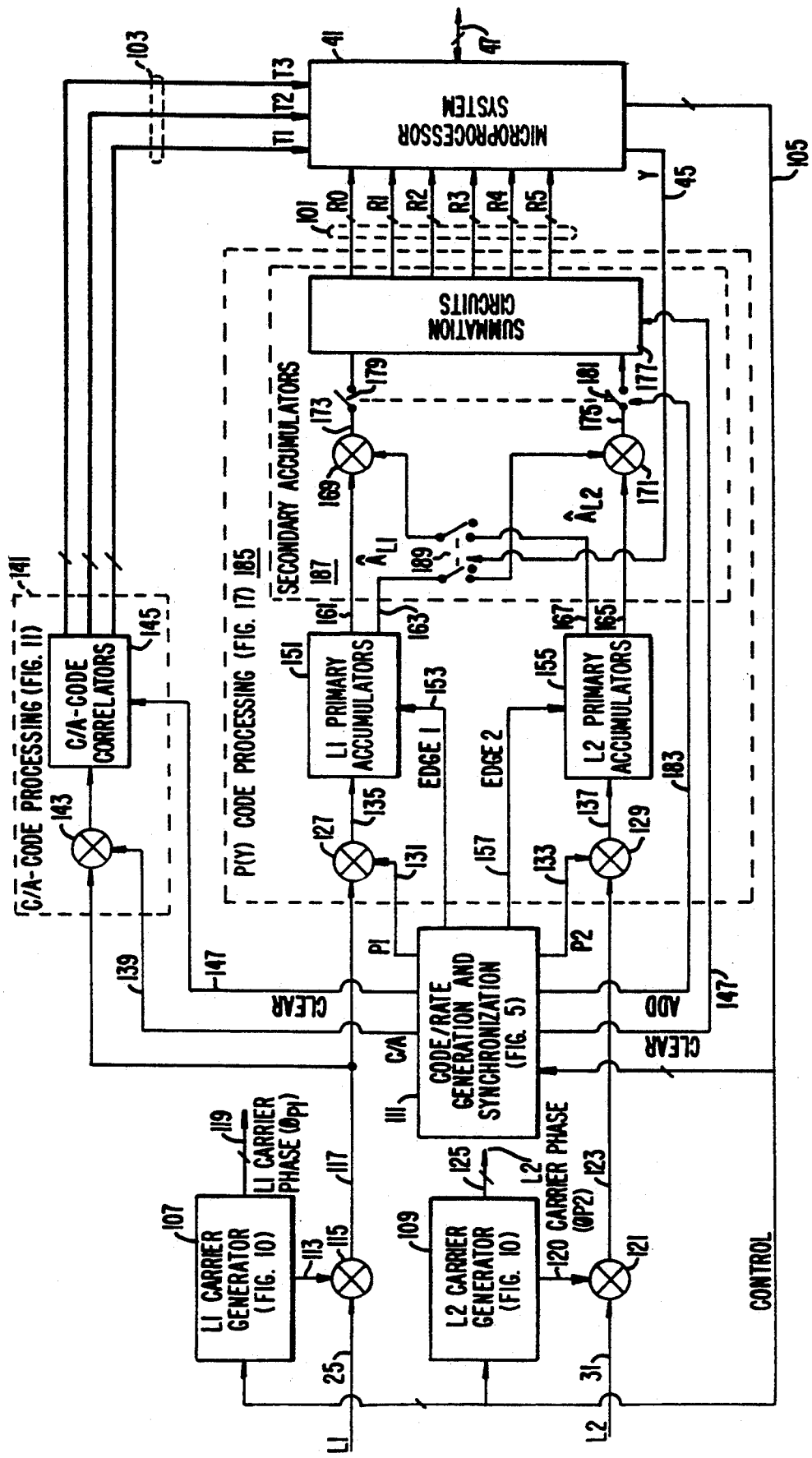
FIG. 4 provides a simplified diagram of a digital channel processor of the system of FIG. 1 and its interaction with the microprocessor system.

Since each of the digital processors 37, 38, 39, 40 . . . , as shown in detail in FIGS. 5-19, is rather complicated, a description of a simplified functional diagram of FIG. 4 is first made. Some simplifications have been made in FIG. 4 in order to better explain the overall operation of the digital channel processors in conjunction with the microprocessor system 41 that is part of the present invention. Reference numbers on the illustration used in FIG. 4 are the same as those used in the more detailed preferred embodiment diagrams of FIGS. 5-20.

The digital channel processor has as a goal the development from the L1 and L2 signals in circuits 25 and 31 a number of observables R0 through R5, indicated in separate digital circuits 101 applied to the microprocessor system 41. The information in those signals, plus information in signals T1-T3, indicated in separate digital circuits 103, allows the microprocessor system 41, through a control bus circuit 105, to adjust the phase of two carrier generators 107 and 109 and various code and code rate generators included within a block 111. The outputs of these carrier generators and code and code rate generators are used to demodulate the received L1 and L2 signals. The phases of the demodulating signals are shifted under control of the microprocessor system 41, in general, to align them to the incoming signals L1 and L2, as indicated in the digital output observable signals R0–R5. Those relative phase values are then read by the microprocessor system 41 and passed onto a host processor for calculating the ultimate position, distance, time or other parameter that the receiver is designed to measure.

The carrier generator 107 provides an output in circuits 113 that is a replica of the carrier in the L1 signal. A mixing stage 115 results in an output in circuits 117 that effectively removes the carrier from the L1 signal when the locally-generated carrier is in phase with that of the incoming L1 signal. That relative phase is read from digital circuits 119.

Similarly, a replica of the carrier in the L2 signal is generated in circuits 109 and coupled by circuits 120 to a mixing stage 121, thereby providing a demodulated output in circuits 123. Similarly, the correct phase alignment of the locally-generated carrier signal in circuits 120 with that in the incoming L2 signal causes that carrier to be removed in the remaining signal in circuits 123. The relative phase of the carrier is read from circuits 125.

Each of the partially demodulated signals 117 and 123 is then applied to second respective mixing stages 127 and 129. The known P-code of the satellite being tracked by a particular digital channel processor is generated within the circuits 111 and applied through circuits 131 and 133 as demodulating signals to the mixing stages 127 and 129, respectively. The same P-code occurs in each of the circuits 131 and 133, but those replica signals are shifted in relative phase somewhat with respect to each other because of unequal delays of each of the L1 and L2 signals by the ionosphere from the satellite being followed. When those phases are aligned with the P-code contained on the L1 and L2 signals, the demodulated signals in circuits 135 and 137 are free of the P-code.

Similarly, the C/A-code for the satellite being followed is generated by the circuits 111 and applied by a circuit 139 to a C/A-code processing circuit 141. This includes a mixing stage 143 and correlators 145. The mixing stage 143 receives the L1 signal in circuit 117, after the carrier has been removed. The signal in line 117 is then mixed with the C/A-code in the mixer 143. The relative phase of that code is adjusted to cause a match with the phase of the code in the L1 signal, as detected by the microprocessor system monitoring the quantities T1–T3. A "clear" signal in circuit 147 is generated every one millisecond, in synchronization with generation of the C/A-code by the circuits 111. This clearing signal is used by the correlators 145.

The demodulated L1 signal in circuit 135 is applied to circuits 151 that integrate signal over periods defined by an "Edge 1" control signal in a circuit 153. Similarly, integrating circuits 155 receive the signal from circuit 137 and integrate it over periods between pulses in an "Edge 2" control circuit 157. The timing of the Edge 1 and Edge 2 signals, and thus the integration periods of the respective integrators 151 and 155, is determined from the estimated timing of the unknown A-code with which both of the received L1 and L2 signals can be modulated.

Each of the integrating circuits 151 and 155 have two basic types of outputs. A first output of the integrators 151 in a circuit 161 is a value of the integration, and a second output in circuits 163 is its sign. That sign is an estimate of the A-code as derived from the L1 signal. Similarly, the integrator 155 has an output in circuits 165 that corresponds with the integration while its sign is outputed in circuit 167 and is an estimate of the modulating A-code during the period of integration by the integrators 155, as derived from the L2 signal. A mixer 169 in the L1 signal path receives its integrated signal and mixes it with the A-code estimate derived from the L2 signal. Similarly, a mixing stage 171 in the L2 signal path mixes the A-code estimate derived from the L1 signal with the signal in circuits 165. Outputs of these mixing stages in respective circuits 173 and 175 are then a signal that has had the unknown A-code modulation removed to a large extent from both of the L1 and L2 signals, provided that estimates of its timing made in generating the Edge 1 and Edge 2 integration time signals by the circuits have been correct.

The periodic integrations of the L1 accumulators 151 and L2 accumulators 155 are added together by additional accumulators in summation circuits 177. The results of the accumulations in the integrators 151 and 155 are periodically transferred to the summation circuits 177 through switches 179 and 181 that are operated by an "Add" control signal in a circuit 183. The accumulation of these periodic integrals generates the desired observables R0–R5 in circuits 101 which the microprocessor uses to adjust the phases of the carrier and code generators to cause them to align with components of the received L1 and L2 signals. The circuits within a dashed box 185 and those within a dashed box 187 are functional equivalents of receiver circuits identified in FIGS. 5–19 with the same reference numbers.

It has previously been described with respect to FIG. 4 that the A-code rate estimate derived from each carrier signal, in circuits 163 and 167, are mixed with the signals in respective mixers 169 and 171. Of course, this is only necessary if the P-code in each of the L1 and L2 signals is being modulated by the unknown anti-spoofing A-code signal. Therefore, a switch 189 is provided in the signal paths 163 and 167 to open in response to the control signal Y in line 45 when the satellite signal does not contain the anti-spoofing A-code signal. There is obviously then no need to provide an estimate of the unknown A-code.

Code/Rate Generation and Synchronization

Figure 5:
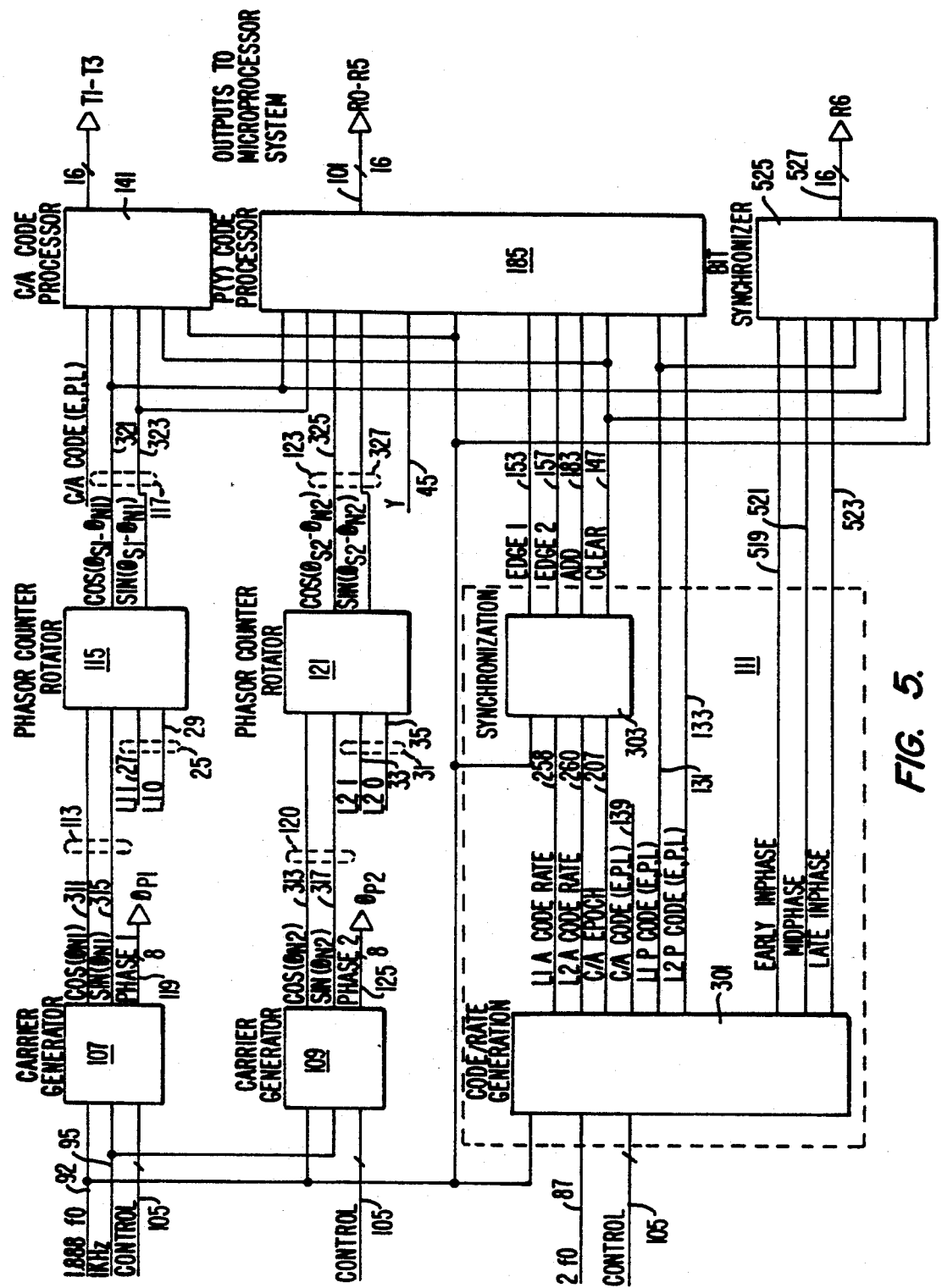
FIG. 5 is a more detailed block diagram of the digital channel processor of the system of FIG. 1.
Figure 6:
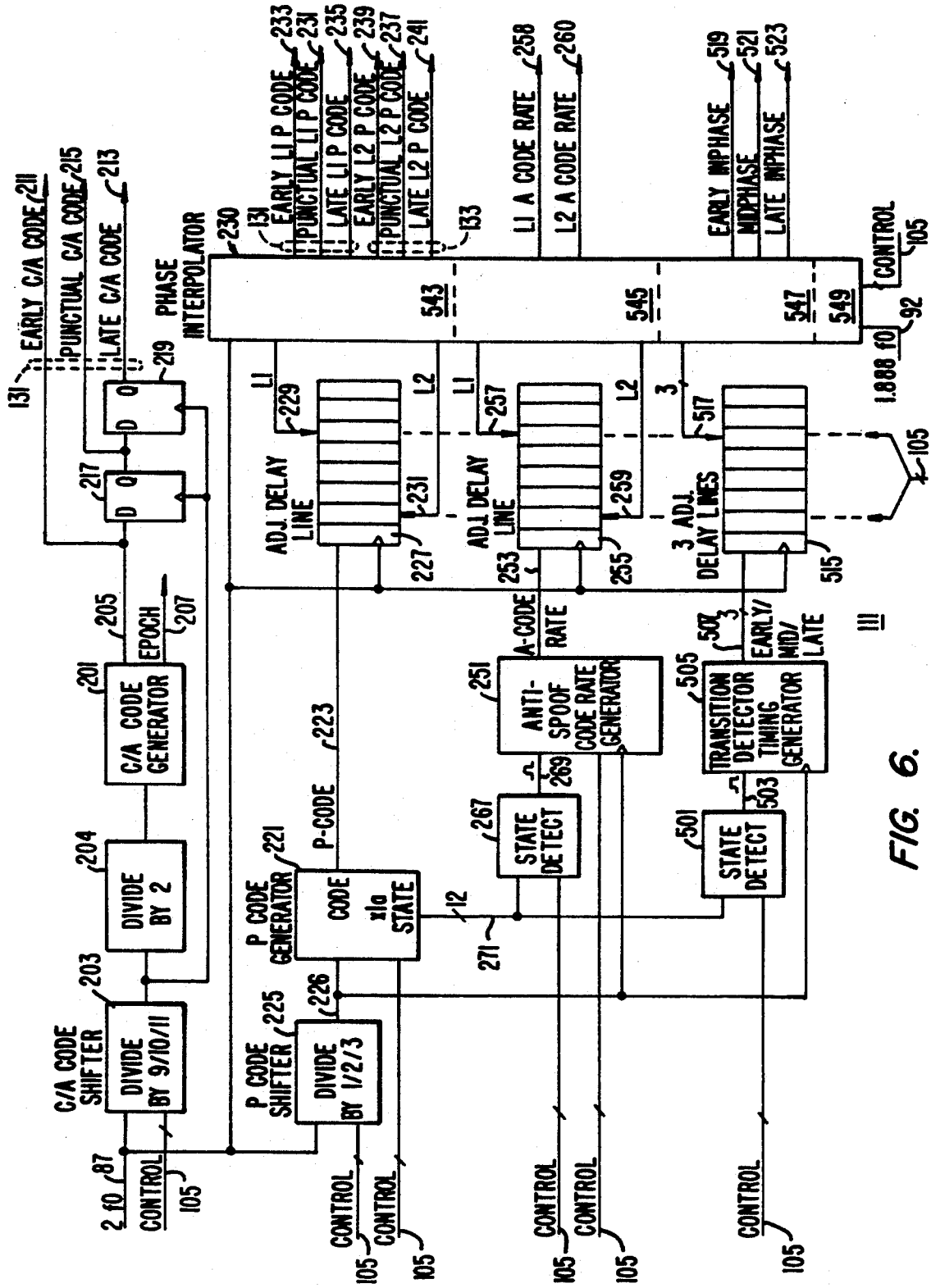
FIG. 6 illustrates the details of the code/rate generation circuits of the digital processor illustrated in FIGS. 4 and 5.
Figure 7:
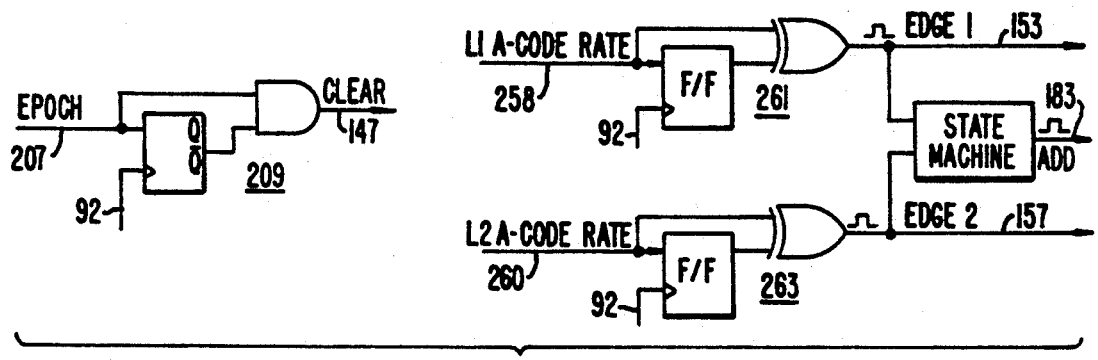
FIG. 7 shows the synchronization circuit of FIGS. 4 and 5.

FIGS. 6 and 7 illustrate in detail a preferred code/rate generation and synchronization circuit 111 combination as illustrated in the simplified digital channel processor diagram of FIG. 4 and the more complete processor diagram of FIG. 5. The circuit of FIG. 6 has three principal functions, among others. One is to generate a receiver's replica of the C/A-code contained in the L1 signal of the satellite being monitored by the particular digital channel processor of which the FIG. 6 circuit is a part. The second is to generate replicas of P-code, for both the L1 and L2 signals of the satellite being monitored. The third function is to generate an estimate of the rate of the anti-spoofing A-code and develop from that signals which time the integration period of the primary accumulators 151 and 155.

Referring first to the generation of a C/A-code, a generator 201 of the same code used by the satellite being tracked responds to a clock signal from a circuit 203 to generate in a line 205 such a C/A-code digital signal. This signal repeats every one millisecond. A second output line 207 of the generator circuit 201 is asserted every one millisecond upon the G1 shift register within the generator reaching its epoch state of 1111111111. The rising edge of this signal is detected by circuit 209 (FIG. 7), to generate the Clear signal in line 147 that has been discussed previously with respect to FIG. 4. The Clear signal occurs every one millisecond in synchronization with the locally-generated C/A-code in line 205.

As is standard, the C/A-code is provided with three different relative phases in lines 211, 213, and 215. The output of the generator 201 is passed through two delaying circuits 217 and 219 in series to provide a late C/A-code in line 213. The period of delay in each of the circuits 217 and 219 is one-half of a C/A-code cycle or chip. An early C/A-code is provided in line 211 that is outputted directly from the C/A-code generator 201. A punctual C/A-code in line 215 has a phase in between the early and late codes and is taken from the junction intermediate of the two delay circuits 217 and 219. The relative phase of the C/A-code being generated is controlled over the microprocessor control bus 105 through the shifting circuit 203.

A P-code generator 221 outputs in line 223, in response to a clock signal from circuits 225, the P-code generated in the satellite whose signals are being tracked. Rather than use a separate P-code generator for each of the L1 and L2 signals, as is usually the case, a single generator 221 is used but the phases of the P-code applied to the L1 and L2 signals are controlled by a digital delay line 227. A first tap 229 provides a P-code for mixing with the L1 signal. A second tap 231 is provided as part of the delay line 227 to supply the P-code for mixing with the L2 signal. The space between these taps 229 and 231 is due to the different amount of phase delay experienced by the different frequency L1 and L2 signals when passing through the Earth's ionosphere.

The relative phases of these L1 and L2 P-code signals are more finely adjusted, to a higher resolution than practical by use of the delay line 227 itself, by a phase interpolator 230 that is described below in another section, with reference to FIGS. 15 and 16. The result is a punctual L1 P-code signal in a line 231, an early L1 P-code signal in line 233, and a late L1 P-code signal in line 235. Similarly, a punctual L2 P-code signal is generated in line 237, with an earlier version appearing in line 239 and a later version appearing in line 241. The early and late signals are respectively shifted in time ahead and behind the punctual signal by one-half the P-code cycle or chip. The relative phases of the L1 and L2 P-code signals are coarsely shifted by commands from the microprocessor over the control bus 105 to the delay line 227 in effectively moving the positions of the taps 229 and 231, and more finely adjusted by the interpolator circuits 230. Also, the phases of both the L1 and L2 P-code signals can be shifted together using the P-code shifter 225.

An A-code rate generator 251 generates a signal in a line 253 that has a transition coincident with an estimate of the end of each bit of the unknown A-code. That signal is delayed by an adjustable digital delay line 255 of the same type as the delay line 227 used in generating the L1 and L2 P-code. A tap 257 obtains such a signal for use in timing integration of the L1 satellite signal, the result occurring in a line 258 at the output of the phase interpolator 230, a form of this signal being shown in FIG. 8(C). Similarly, a second tap 259 is provided to adjust the relative phase of the A-code rate signal for use in the L2 signal processing and is more finely adjusted by the phase interpolator circuits 230. An example of a phase adjusted L1 A-code rate signal in line 260 is shown in FIG. 8(D). The L1 A-code rate signal in a line 258 is applied to an edge detecting circuit 261 (FIG. 7) to develop the Edge 1 signal pulse in line 153 each time the signal in the line 258 changes state, as shown in FIG. 8(E). Similarly, an edge detector circuit 263 produces the Edge 2 signal pulse in line 157 upon a transition of the A-code rate signal in line 260, as shown in FIG. 8(F). A state machine 265 responds to occurrence of both the Edge 1 and Edge 2 pulses to generate the Add pulse in line 183, an example of which is shown in FIG. 8(G).

Since it is known that the period of each A-code cycle is approximately 20 P-code cycles, the A-code rate generator 251 responds to a clock signal from the same circuits 225 as does the P-code generator 221, but generates a transition in output line 253 only once every approximately 20 P-code cycles. It is further believed that the anti-spoofing signal is generated in synchronism with the P-code, so programmable synchronization circuits 267 are provided to generate a synchronizing pulse in a line 269 to the A-code rate generator in response to detecting a particular state of the X1A register of the P-code generator over lines 271. That detected state can be, for example, the epoch state of the X1A register, which is 001001001000.

In addition to the A-code rate generator 251 being synchronized with the P-code generator 221, the taps 257 and 259 of the A-code rate delay line 255 are adjusted along with the respective counterpart taps 229 and 231 of the P-code delay line 227. This further maintains the A-code rate signals being generated in complete synchronism with the P-code signals.

FIG. 8(H) shows an example state of the L1 primary accumulators 151 (FIG. 4). Its input signal in circuit 135 is integrated for a time between successive Edge 1 pulses. Similarly, the L2 primary accumulators 155 integrate the signal in their input circuit 137 between successive Edge 2 pulses, as illustrated in FIG. 8(I). The value of the integration is passed on to the next stage and mixed there with the sign of the integration from the primary accumulator of the other channel, as discussed with respect to the mixers 169 and 171 of FIG. 4. It is that sign that is an estimate of the A-code during the interval between the edge pulses, and that is used to remove its effect from the signals being processed. The result of each such integration and mixing, when effectively averaged over a number of such periods by the secondary accumulators 187, mitigates the effect of the unknown A-code modulation when the Edge 1 and Edge 2 pulses are synchronized with the ends of the A-code cycles. That is, for the purpose of this integration, the content of the code is not required but only an approximation of its timing is desired. Although optimum operation occurs when the Edge 1 and Edge 2 signals are generated exactly at the termination of each A-code cycle of the received signals, it is satisfactory if this is only approximately achieved, so long as the A-code estimate is not in phase quadrature to the actual code. Even if the actual A-code and its estimate generated in the receiver are asynchronous, the system operates acceptably, although with some degradation.

As stated above, it is known that the cycle time of the A-code is equal to approximately 20 cycles or chips of the P-code. It has been deduced that the A-code cycle time is not uniform, but rather repeats in a pattern of a number M of A-code cycles or chips each having a duration of A P-code cycles or chips, followed by N A-code cycles that each are B number of P-code cycles in length. It is desired to provide a A-code rate generator 251 where the parameters A, M, B, N are programmable over the microprocessor control bus 105. The A-code rate sequence would repeat after $A \times M + B \times N$ cycles of the P-code clock. In order for this sequence to be synchronous with the X1A register of the P-code generator, $A \times N + B \times M = 4092$. This programmability, along with the ability to synchronize the A-code rate generator 251 with the P-code generator 221 (FIG. 6), allows the rate of the A-code to be adjusted to optimize the digital channel processor operation.

Figure 9:
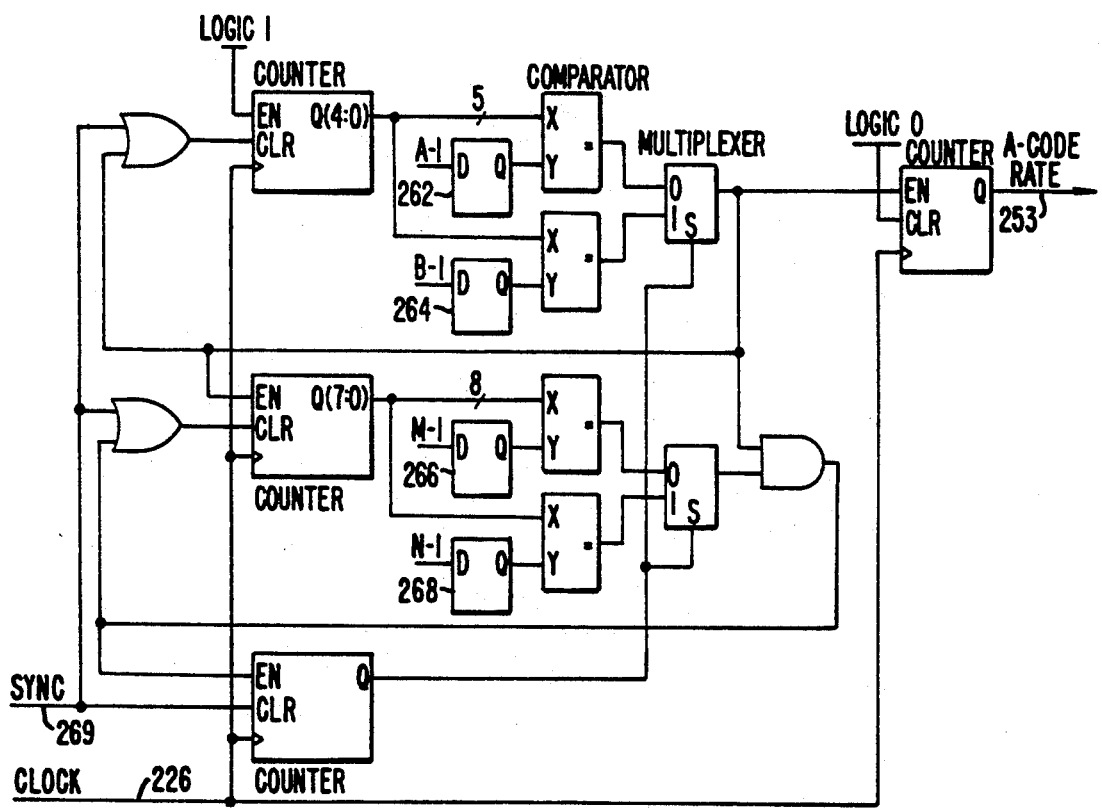
FIG. 9 shows the details of a preferred implementation of the anti-spoof code rate generator of FIG. 6.
Figure 8:
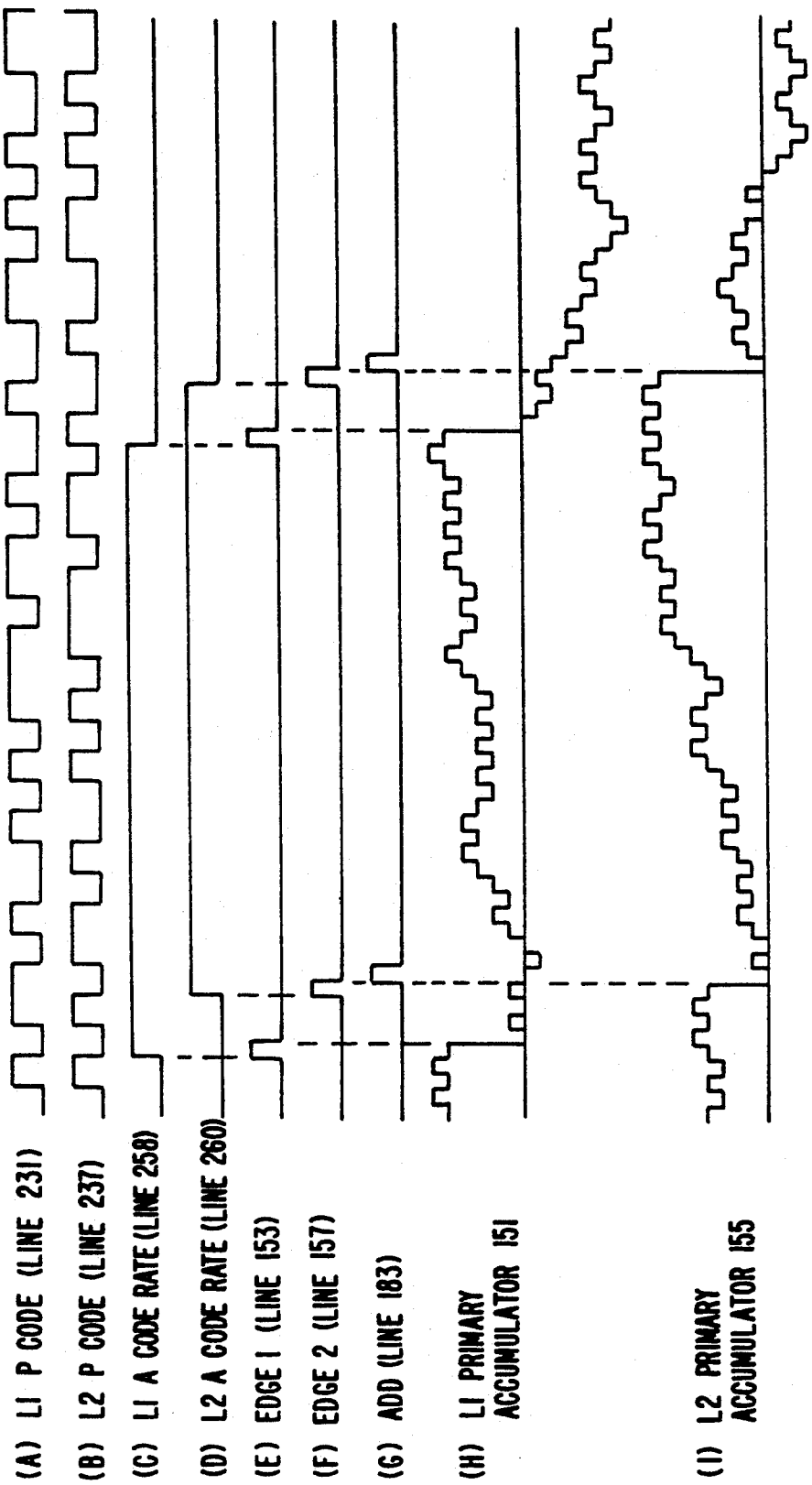
FIGS. 8(A)-(G) show timing diagrams of several signals of the code generation and synchronization circuit of FIG. 6.
FIGS. 8(H) and 8(I) provide illustrative waveforms used to explain the operation of the digital processor shown in the diagrams of FIGS. 4 and 5.

Referring to FIG. 9, an exemplary circuit for the A-code rate generator 251 of FIG. 6 is given that is adjustable in the manner discussed above. Registers 262, 264, 266 and 268 store, respectively, the quantities A, B, M and N defined above. These registers are loaded under the control of the microprocessor system 41 over the system bus 105. The circuit of counters, gates and flip-flops then repetitively provides the bit pattern in an output 253 that matches the timing of the anti-spoofing signal of the satellite signals being processed.

Figure 10:
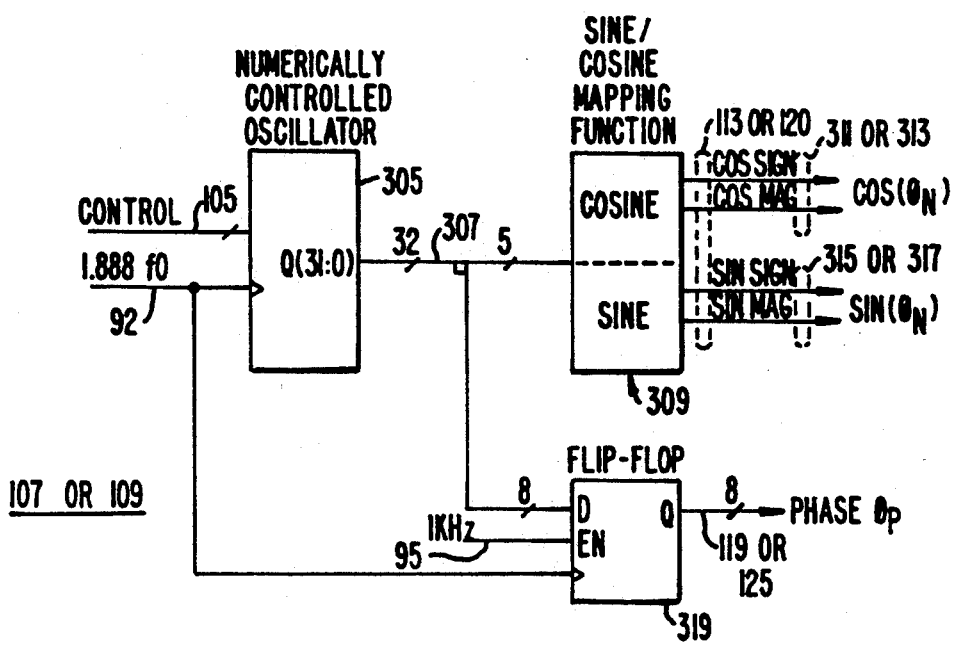
FIG. 10 shows the details of each of the two carrier generators employed in the digital channel processor as illustrated in FIGS. 4 and 5.
Figure 12:
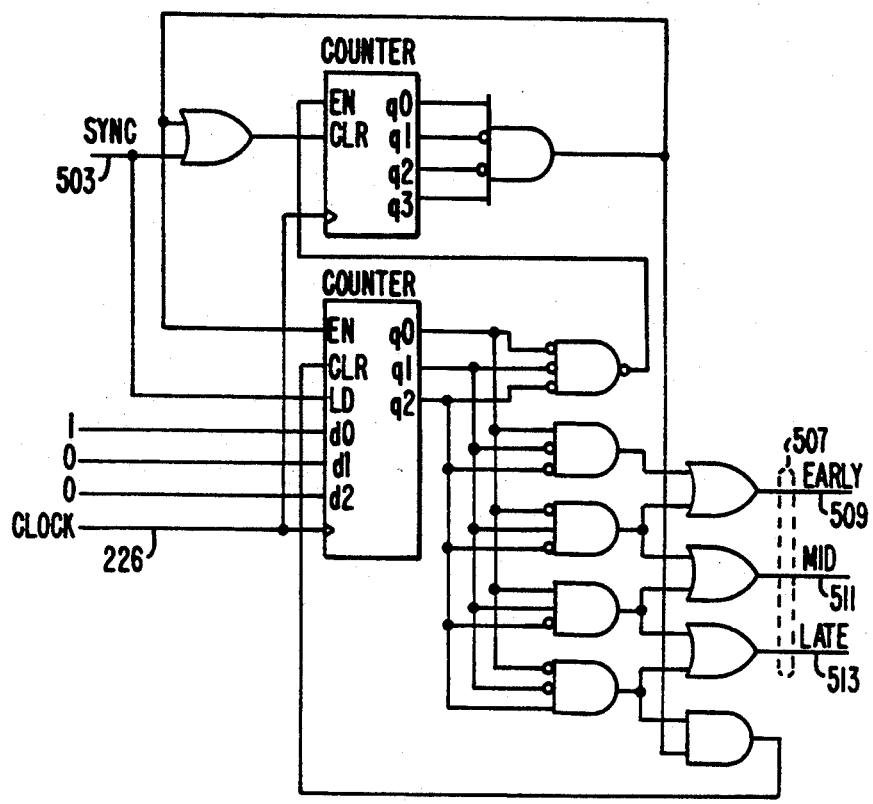
FIG. 12 shows a another portion of the code/rate generation circuit of the digital channel processor as illustrated in FIG. 5.
Figure 14:
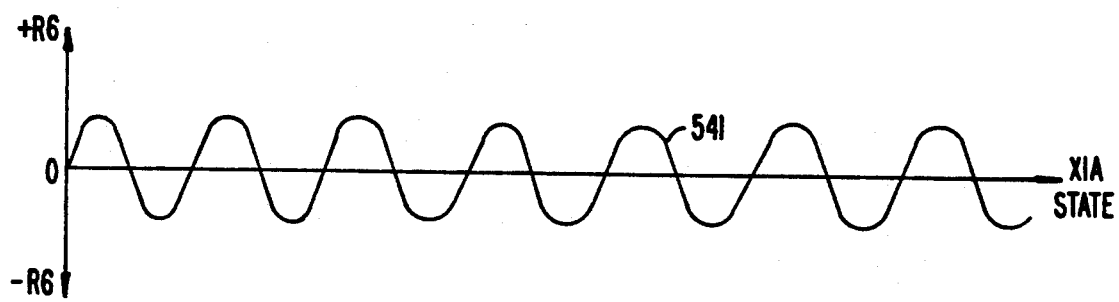
FIG. 14 is a curve illustrating operation of the bit synchronizer circuit of FIG. 12.
Figure 13:
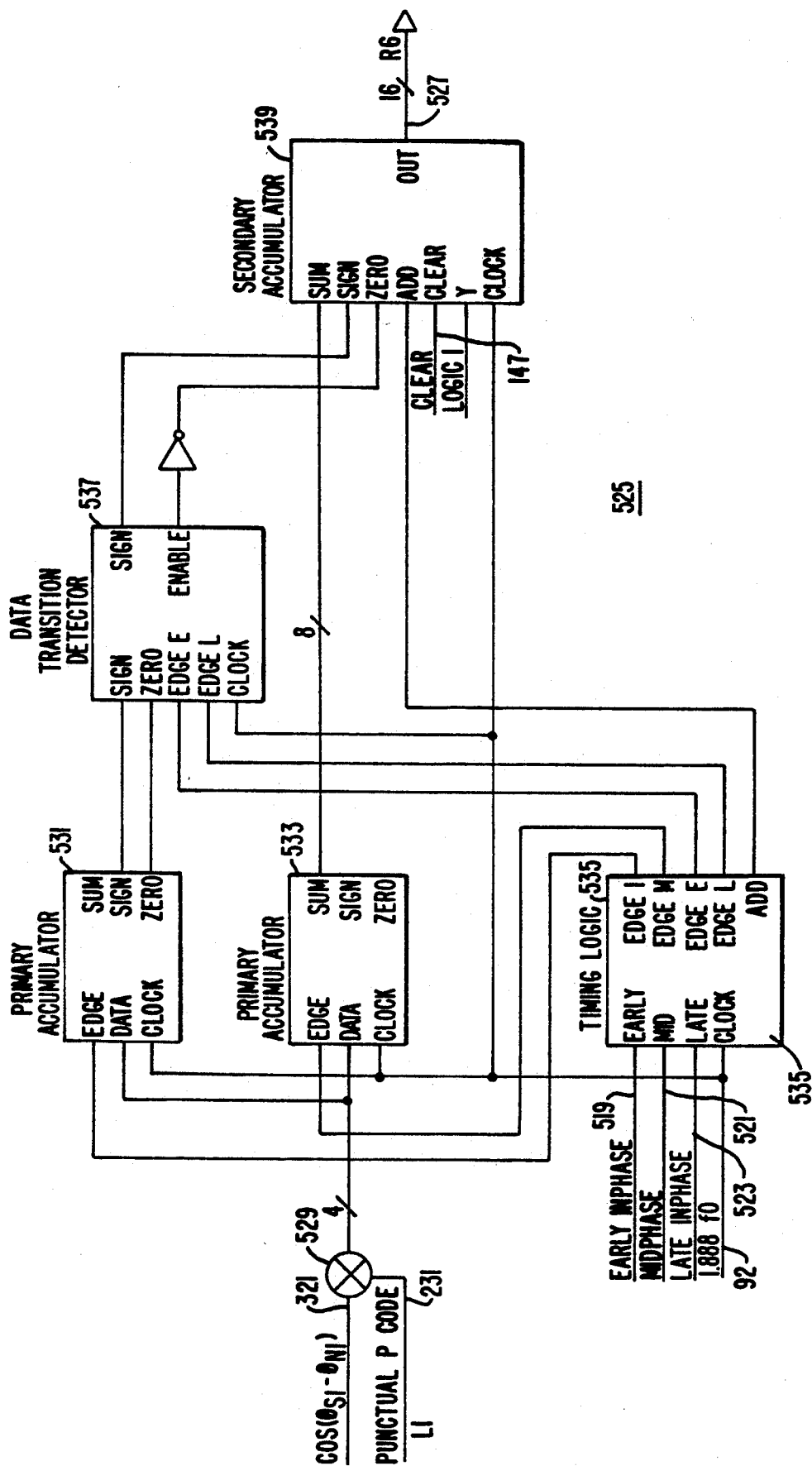
FIG. 13 shows the bit synchronizer circuit portion of the digital channel processor as illustrated in FIG. 5.

With reference again to FIG. 5, a more detailed representation of a preferred digital channel processor is given. Each of the L1 carrier generator 107 and L2 carrier generator 109 includes a circuit shown in FIG. 10. A numerically controlled oscillator 305 provides a relative phase output in circuits 307 in response to a microprocessor command communicated over the control bus 105. This relative phase is decoded by circuits 309 to provide both cosine and sine functions. A cosine output is represented as 311 or 313, depending upon whether the circuit of FIG. 10 is serving as the L1 carrier generator 107 or L2 carrier generator 109 of FIG. 5. Similarly, a sine output provides signals in the circuits 315 or 317 of FIG. 5. A phase latch circuit 319 periodically stores the output of the numerically controlled oscillator 305 to provide a signal in either of the lines 119 or 125 that gives the oscillator's relative phase.

Referring again to FIG. 5, a mixing stage 115 receives those outputs from the L1 carrier generator 107 and mixes them with the quadrature L1 received signals in circuits 25 to provide an output in circuits 117. The signal in a circuit portion 321 of the output circuits 117 is labeled $\cos(\phi_{s1} - \phi_{N1})$ to show the relative phase relationship between the phase $\phi_{s1}$ of the L1 P-code carrier being received, and the phase $\phi_{N1}$ of the numerically controlled oscillator 305 of the L1 carrier generator 107. Similarly, a second output line 323 carries the signal that is labeled as $\sin(\phi_{s1} - \phi_{N1})$. The signals, in lines 321 and 323, can be seen to represent differences between the relative phases of the carrier of the L1 signal being received and that of the replica of that carrier that is being generated within the receiver in the L1 carrier generator 107. These signals also have the C/A-code and P(Y)-code on them. The goal of the system, of course, is to lock the locally generated carrier in phase with that of the signal being received from the satellite. When that is the case, the phase difference ($\phi_{s1} - \phi_{N1}$) is zero, the cosine function in line 321 then being one, and the sine of that function in line 323 being zero. The use of these quadrature functions permits simplified and rapid locking of the carrier and code loops in the system. The signals in the lines 321 and 323 provide this L1 relative phase information to both the C/A-code processor 141 and P(Y) code processor 185 described below in another section, to obtain the observables T1–T3 and R0–R5 that are used to lock the carrier and code loops.

The mixer 121 performs the same function in the L2 carrier path as does the mixer 115 in the L1 carrier path. One of the two outputs 123, in a line 325, is $\cos(\phi_{s2} - \phi_{N2})$, where $\phi_{s2}$ is the P-code carrier relative phase of the L2 signal being received, and $\phi_{N2}$ is the relative phase of the numerically controlled oscillator 305 that is provided as part of the L2 carrier generator 109. In a line 327 is the signal $\sin(\phi_{s2} - \phi_{N2})$. The signals in the lines 325 and 327 provide L2 relative phase information to the P(Y) code processor 185.

Receiver Adaptation to the Unknown Anti-Spoofing Signal

In order to adapt the receiver to the A-code timing described above, either initially or because one or more of the assumptions stated above is not correct, circuits are provided as part of the receiver itself to appropriately align the A-code rate signal of the generator 251 of FIG. 9 with the received A-code in conjunction with the locally generated P-code when an actual satellite signal is being received that has the anti-spoofing turned on.

These circuits include logic 501 of FIG. 6 that detects from the circuit 271 a particular state of the P-code generator X1A register as designated over the control bus 105. In response to this state being detected, a synchronizing pulse is issued in line 503 to an inphase/midphase transition detector timing generator 505, an example of which is given in FIG. 12. The transition detector 505 is of a well known type and generates three separate timing signals in circuits 507 that are related to an edge of the pulse in the circuit 503, thereby related in time to the occurrence of the P-code generator 221 X1A register state to which the state detection circuit 501 is set by the system to respond. These three signals are an early one in a line 509, synchronous with that state, a mid one in a line 511, which is delayed by 10 P-code chips from the pulse in line 503, and a late one in a line 513, delayed by 20 P-code chips. The duration of each of these three signals is 20 P-code chips, equal to the approximate width of the A-code bit.

The relative phases of these three signals are adjusted by use of three separate digital delay lines, shown in FIG. 6 as a single delay line 515 for simplicity, having output taps adjustable together, indicated by a single tap 517. These taps are further adjusted together with the L1 taps 229 and 257 of the delay lines 227 and 255, respectively. The delay lines provide a coarse phase adjustment of the early/mid/late signals, which are more finely adjusted by the phase interpolator 230, described hereinafter, to provide an early inphase signal in line 519, a midphase signal in line 521 and a late inphase signal in line 523, respectively.

With reference to FIG. 5, it is noted that these timing signals in lines 519, 521 and 523 are used by a bit synchronizer 525 to develop an observable R6 in circuits 527. An example bit synchronizer circuit is given in FIG. 13, receiving developed L1 signals in lines 231 and 321 and mixing them in a mixer 529. When the carrier and code loops are locked, the output of the mixer 529 is a signal representing the received L1 P-code signal with its carrier and P-code removed by demodulation. This output signal represents the A-code of the L1 signal, plus noise. Primary accumulators 531 and 533 integrate this result over periods defined by logic 535 in response to the inphase/midphase timing signal inputs in lines 519, 521 and 523. A secondary accumulator 539 accumulates and averages a number of such integrations that take place over a one millisecond interval, as defined by the clear signal in line 147.

When tracking the Y-code, even if the A-code rate is asynchronous to the received A-code, the R6 observable provides an indication of how closely the edges of the midphase signal in line 521 of the transition detector are in phase quadrature to those of the A-code in a satellite signal being received. The level of R6 (on the y-axis) is shown by a curve 541 in FIG. 14 as a function of the P-code register X1A state (indicated on the x-axis) that is programmed through into the state detection logic 501.

When using this feature being described, the receiver is connected to a directional antenna pointed at a specific satellite. This antenna desirably has 20-25 dB of gain over a 3 dB linearly polarized antenna. An omnidirectional antenna usually used when operating the receiver will have insufficient gain for determining the necessary bit transitions. The A-code rate generator is then programmed to generate an A-code rate that is asynchronous with the actual A-code rate of the received signal. This causes a pseudo-random phase relationship between the integration period of the primary accumulators and the received A-code timing. It is still possible to track the Y-code signals when the A-code rate generator is asynchronous to the actual A-code rate; however, some degradation in signal-to-noise ratio results. The C/A-code is locked in the usual manner. The Y-code is also locked as described in FIG. 20. When receiving an anti-spoofed signal from the one satellite, the X1A register state loaded into the state detect circuit 501 is varied and the resulting R6 output is observed. Integration by the bit synchronizer circuit 525 is performed for a period of ten seconds for each such register state. This provides one point on the curve of FIG. 14. After one point is obtained, the X1A register state loaded in the state detect circuit 501 is changed and a new value of R6 determined to provide another point on the curve 541.

It is desired to determine the X1A register states that correspond to the zero crossings of the curve 541 (FIG. 14) which have a positive going slope. These are the P-code states where edges exist of the unknown A-code modulated onto the L1 signal being analyzed. Once the timing of these edges is determined, values of A, B, M and N are loaded into registers of the A-code rate generator 251 (FIGS. 6 and 9) and a beginning state is loaded into the state detect circuit 267 (FIG. 6), in order that the A-code rate signal generated in line 257 has edges at the same X1A register states as determined for the actual signal.

Since there are 4092 states through which the P-code generator X1A register cycles, this represents a significant amount of computation. However, since it is known that edges of the A-code occur at intervals of approximately 20 P-code chips or X1A register states, once a zero crossing with a positive slope of the curve 541 is determined, the next computation is performed by advancing the X1A register state by about 20 counts to look for the next such zero crossing.

Phase Interpolator

Figure 15:
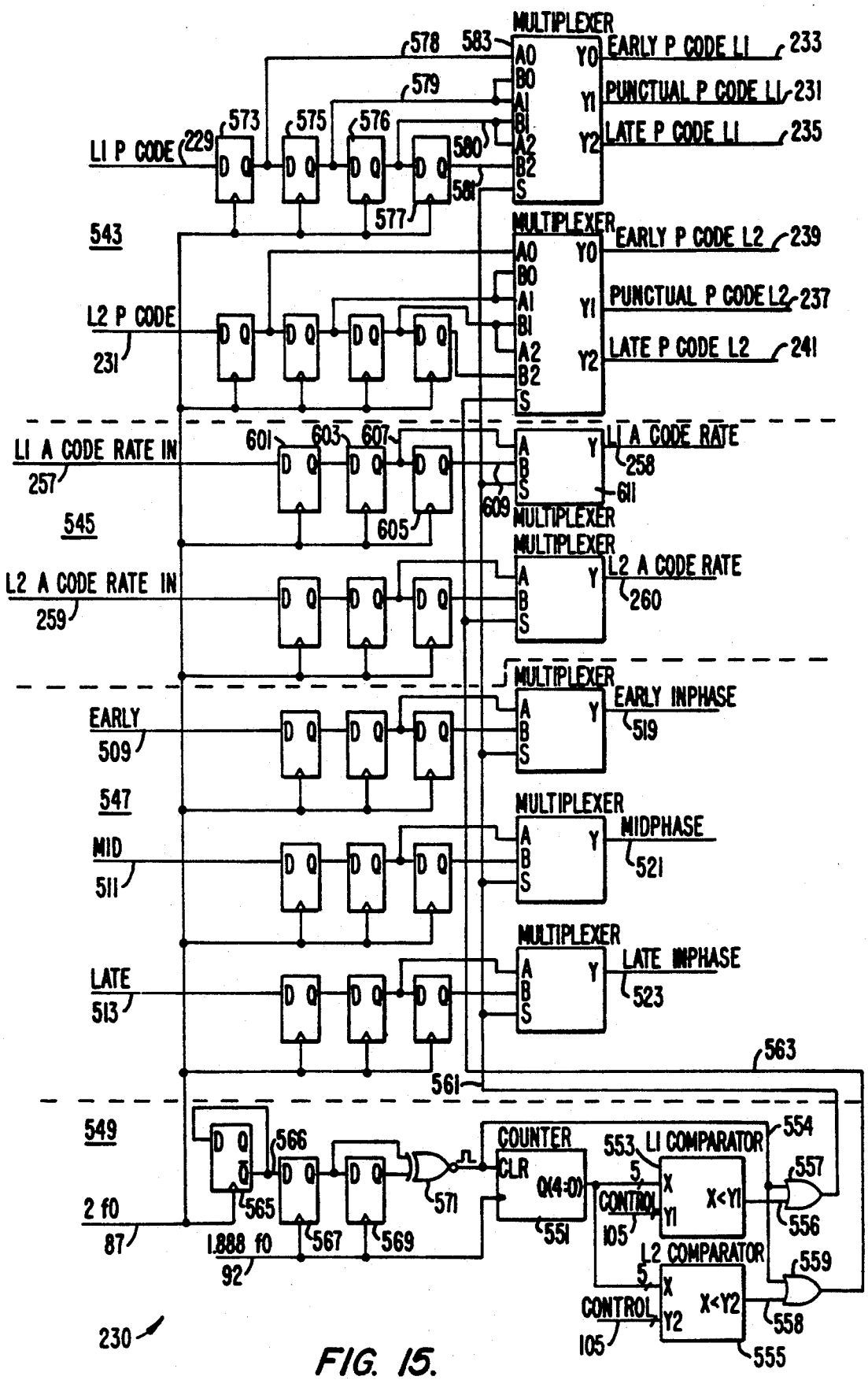
FIG. 15 shows the phase interpolator portion of the code/rate generation circuit of FIG. 6.

The fine phase adjustments mentioned previously are implemented by the phase interpolator 230 of FIG. 6, an example implementation of which is given in FIG. 15, with a sample timing diagram thereof shown in FIGS. 16(A)-(J). The relative phases of three sets of signals are adjusted by the phase interpolator 230. A section 543 finely adjusts the L1 and L2 P-code signals from the delay line 227, another section 545 the L1 and L2 A-code rate signals from the delay line 255, and a third section 547 the early/mid/late signals from the delay lines 515. All three of these sections operate similarly. A final section 549 provides control and timing signals to the other three sections. By increasing in this manner the resolution to which relative phases of various signals can be adjusted, a receiver is provided with very high resolution without the need to use extremely high clock speeds which are impractical since the most commonly used circuit technology cannot operate fast enough to provide the same resolution as provided by the phase interpolation technique of the present invention.

The specific implementation of the phase interpolation technique executed by the circuit of FIG. 15 utilizes two of the system clock signals which are close to each other in frequency. The 1.888 f0 clock in line 92, shown in FIG. 16(B), and the 2 f0 clock in line 87, shown in FIG. 16(C), are synchronous with the 34 f0 clock illustrated in FIG. 16(A), in a manner previously described with respect to FIG. 3. The rising edges of each of the 1.888 f0 and 2 f0 clock signals are utilized for various sampling, counting and similar functions.

The control and timing section 549 of the FIG. 15 phase interpolator circuit utilizes a counter 551 and comparators 553 and 555 as principal components. The 2 f0 clock signal is applied through a flip-flop 565, an output of which in a line 566 is a 1 f0 clock, shown in FIG. 16(D). The line 566 is an input to a second flip-flop 567 that is clocked with the 1.888 f0 clock signal. An output of the flip-flop 567 is provided as an input to a flip-flop 569. Outputs of the flip-flops 567 to 569 are both applied to an exclusive NOR gate 571, whose output in the line 554 is a clear pulse illustrated in FIG. 16(E). This clear pulse occurs from the circuit of FIG. 15 when two consecutive samples of the 1 f0 clock in line 566 taken by the rising edge of the 1.888 f0 clock in line 92, are of the same polarity. This indicates that the clock signal cycles of the 2 f0 and 1.888 f0 clocks at that time are substantially aligned in phase. The clear signal in line 554 then synchronously resets the counter 551. FIG. 16(F) illustrates the states of the counter 551 which is clocked by the 1.888 f0 signal.

The state of the counter 551 is applied to two comparators 553 and 555, which compare its count X with respective reference counts Y1 and Y2, which are loaded through the control bus 105. An output 556 of the comparator 553 provides one input to an OR gate 557, a second input of that gate being the clear signal from line 554. An output in the line 561 of the OR gate 557 is a select signal of a type illustrated in FIG. 16(J). A rising edge of the select signal, at a time t1 in FIG. 16, for example, is coincident with a rising edge of the clear pulse of FIG. 16(E), which is one input 554 to the OR gate 557. A falling edge of the select signal of FIG. 16(J) occurs at a time t2, when the counter 551 is detected by the comparator 553 to exceed the count Y1 that has been loaded in the comparator 553. The timing of the falling edge t2 of the select signal in line 561 is selectable by loading a new quantity Y1 in the comparator 553, but its rising edges are fixed in time with the periodic rising edge of the clear pulses of FIG. 16(E), which coincide with a phase coincidence of the rising edges of the 1.888 f0 and 1 f0 clocks. A similar select signal is generated in a line 563 from a similarly operating comparator 555, which also receives the output of the counter 551, and an OR gate 559, but has a falling edge that is adjustable in time independently of the select signal in the line 561 by the loading of the control count Y2 in the comparator 555. In this example, the select signal in line 561 is used with L1 signals in the interpolator circuit sections 543, 545 and 547, while the select signal in the line 563 is used in those sections with L2 signals.

Using the phase adjustment of the L1 P-code in line 229 as a example, this signal from its delay line tap 229 (FIG. 6) is applied to a series of four flip-flop circuits 573, 575, 576 and 577 in a shift register that is clocked by the 2 f0 signal in line 87. This results in generating the punctual L1 P-code signal in lines 579 and 580 with a phase difference between them of one 2 f0 clock period, which turns out in this example to be one-half the period or chip of the P-code. One of these two signals is selected by a multiplexer 583 (switch) and presented at the output 231 in response to the select signal in line 561. When the select signal is high, such as occurs between times t1 and t2 of FIG. 16, the multiplexer 583 connects the output 231 to the "delayed" version of the L1 P-code signal which exists in line 580. Conversely, when the select signal is low, such as occurs between times t2 and t3 of FIG. 16, the multiplexer 583 connects its output 231 with an "undelayed" version of the signal in line 579.

Figures 16, 17:
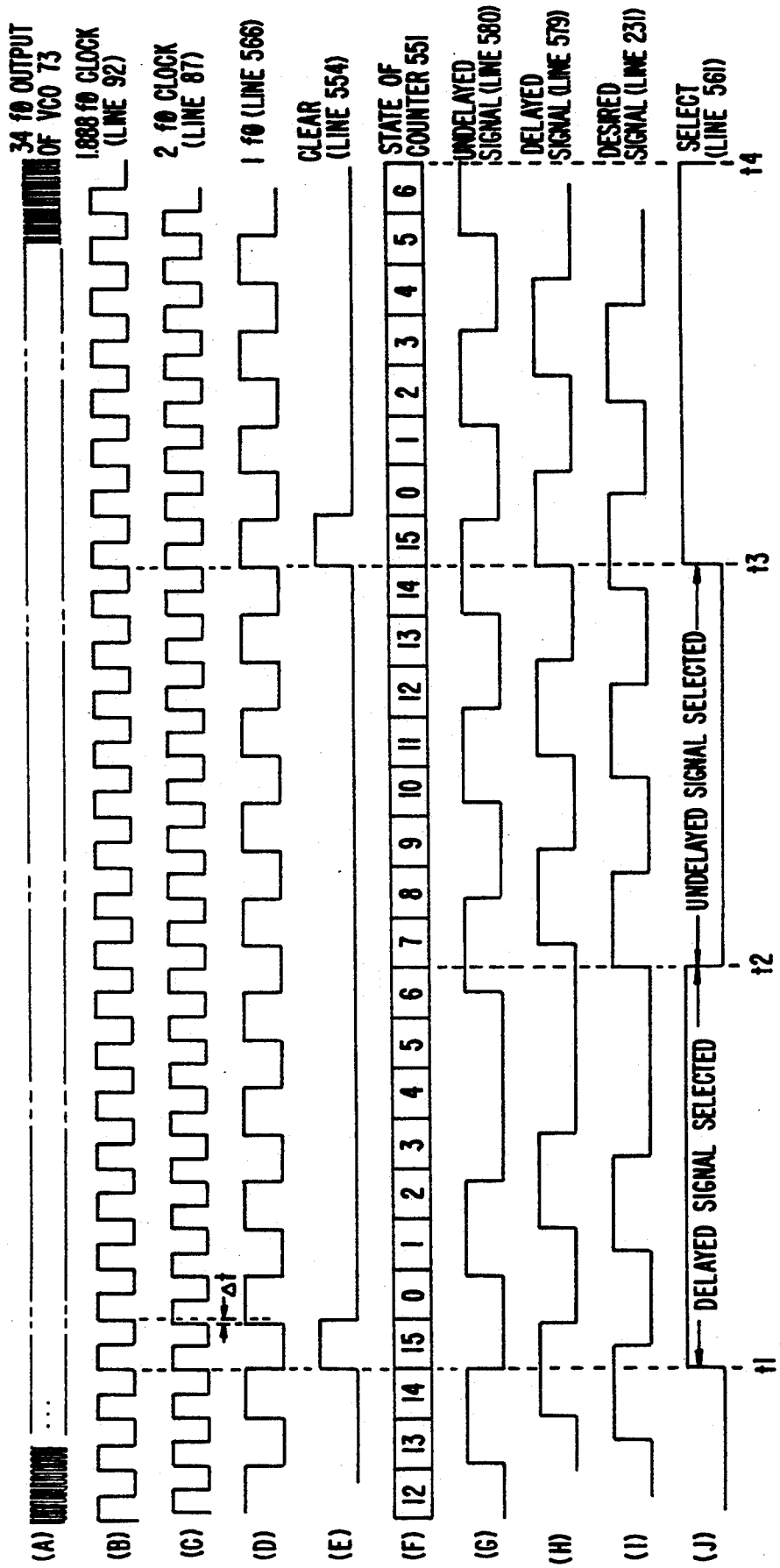
FIG. 17 shows the P(Y) processor portion of the digital processor illustrated in FIGS. 4 and 5.
Figure 17A:
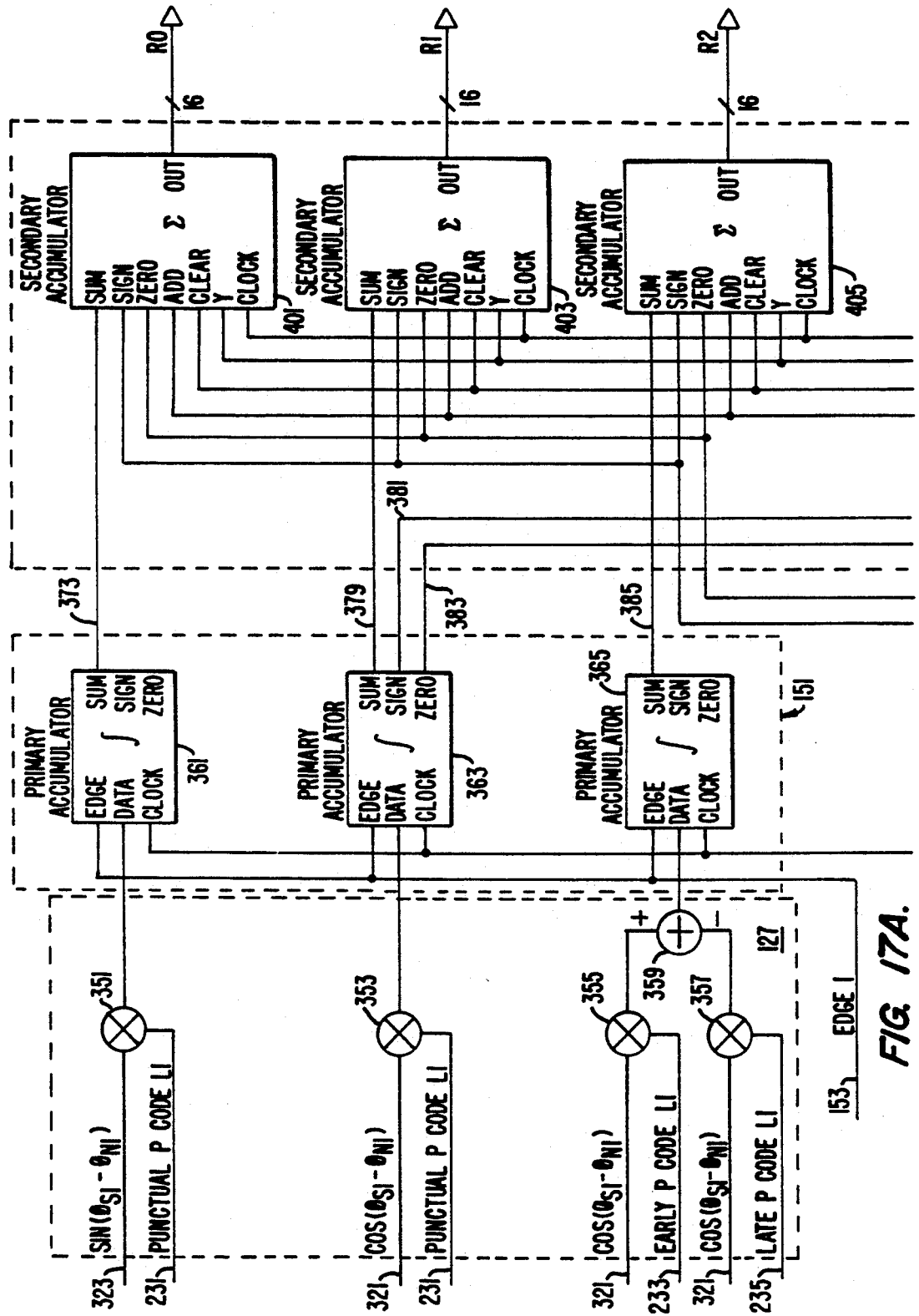
Figure 17B:
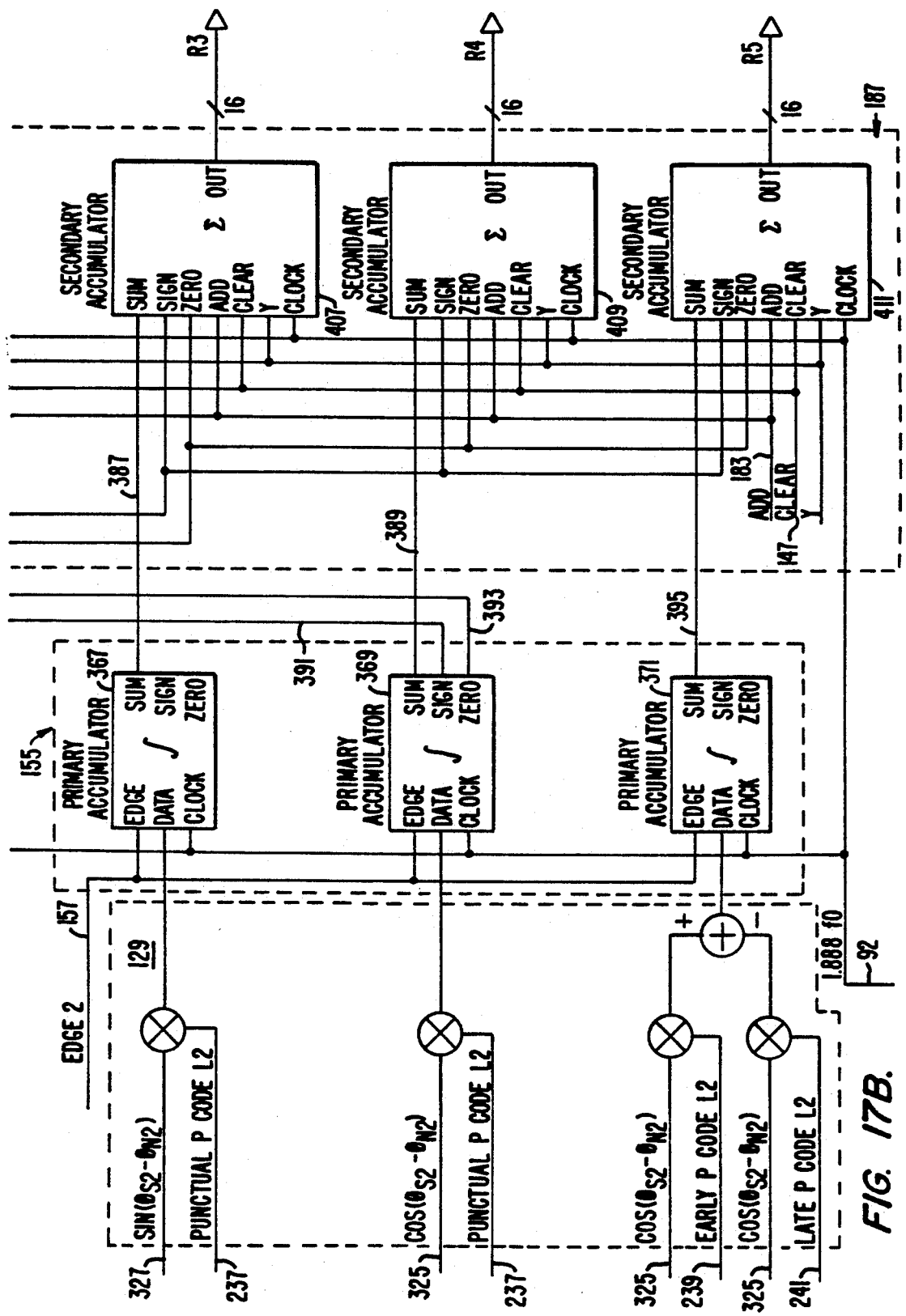
Figure 19:
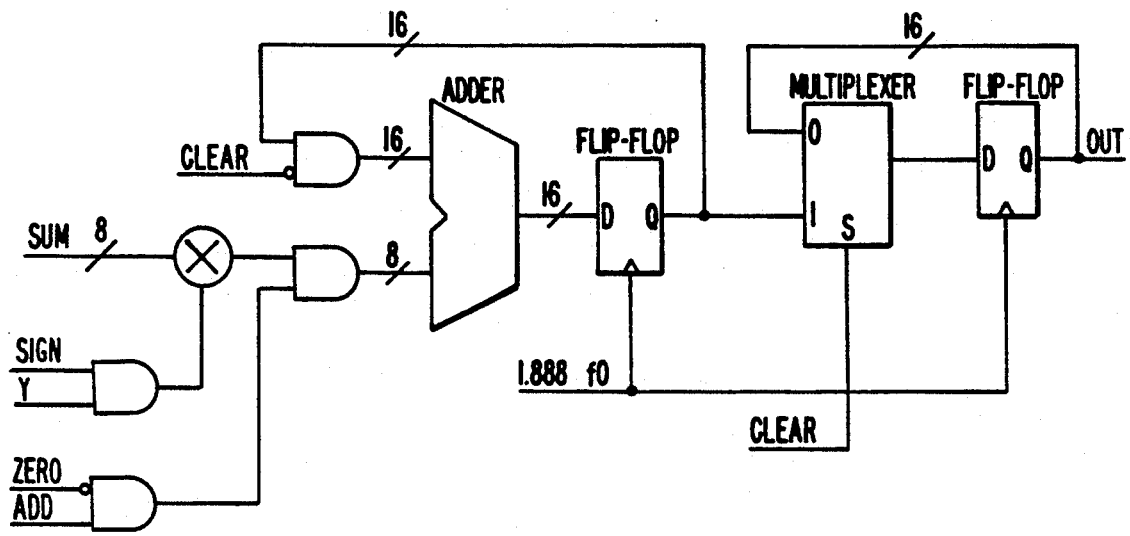
FIG. 19 shows a circuit diagram of each of the secondary accumulators shown in the processing diagram of FIG. 17; and, FIG. 20 illustrates the process steps controlled by the microprocessor system of the embodiment described.
Figure 18:
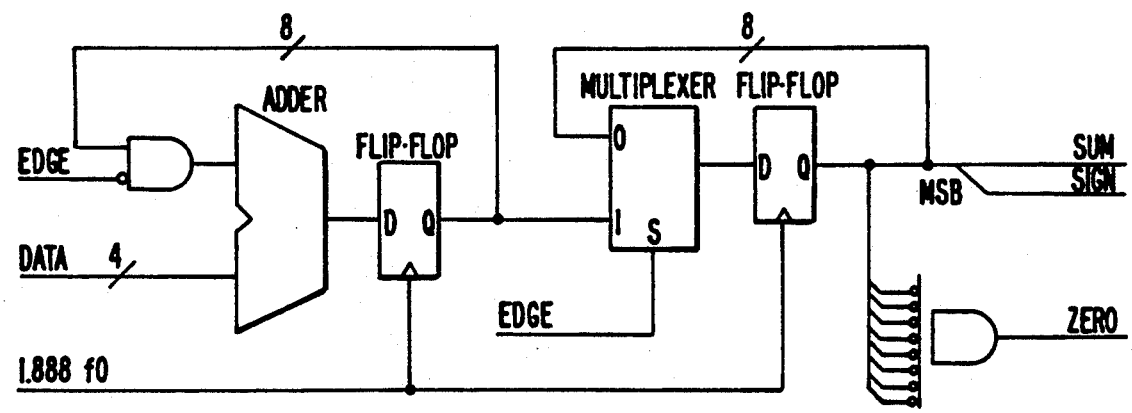
FIG. 18 shows a preferred circuit diagram for each of the primary accumulators in the processing system illustrated in FIG. 17.

Examples of these signals are also shown in FIG. 16. FIG. 16(G) shows an example of the undelayed signal in line 579, FIG. 16(H) an example of the delayed signal in line 580, and FIG. 16(I) an example of the desired punctual P-code signal to be generated in line 231 at the output of the multiplexer 583. It is important to note that, in general, the signal generated at the output of multiplexer 583, in line 231, does not have the same value as the desired P-code phase; however, at all rising edges of the 1.888 f0 clock the output of this multiplexer assumes the same values as the desired P-code signal. The values determined for the desired signal are thus only those coincident with the rising edges of the 1.888 f0 clock. Thus, the signal in the line 258 is finely adjusted in phase as a result of selecting the threshold count Y1 to be loaded in the comparator 553. The value of Y1 determines the count corresponding to the time t2 where the select signal has its falling edge and switches the desired signal from following the delayed signal to following the undelayed signal.

The multiplexer 583 is caused to simultaneously switch connection of the early L1 P-code line 233 between undelayed and delayed versions in lines 578 and 579. Similarly, the late L1 P-code line 235 is switched between lines 580 (undelayed) and 581 (delayed).

The same technique is used to adjust the phase of the L2 P-code signals of lines 237, 239 and 241, except that the L2 select signal in line 563 is connected to switch its multiplexer in providing output signals in the line 231.

In a similar manner, the L1 A-code rate signal in the line 257 is phase adjusted, using a series connection of three flip-flop stages 601, 603, and 605. A multiplexer 611 selects, in response to the L1 switching signal in line 561, either an undelayed version of that signal in a line 607 or a delayed version in a line 609. The L2 A-code rate signal in the line 259 is similarly processed, except that its multiplexer switches between the undelayed and delayed versions of that signal in response to the L2 switching signal in line 563.

The same technique is also used in interpolator section 547 with each of the signals in lines 509, 511 and 513, all of which have their multiplexers switched by the L1 select signal in line 561.

It can thus be seen that the phase interpolator 230 of FIG. 15 operates to adjust the phases its output signals relative to those of its corresponding input signals by control of the counts Y1 (for the L1 signals) and Y2 (for the L2 signals). Each of these counts determines the time t2 (FIG. 16) at which samples of desired output signals cease being taken from delayed versions of input signals and instead begin to be taken from undelayed versions. This switching causes no discontinuity since it is being implemented as part of a sampled data system. When the source of the desired output signal samples is switched back to the delayed input signal, such as at time t1, the leading edges of the 1.888 f0 and 2 f0 clock signals are coincident. After one cycle of each clock signal, the 1.888 f0 leading edge occurs a time $\Delta t$ after the leading edge of the 2 f0 signal, as indicated in FIG. 16. After n number of clock cycles, this difference is $T = n\Delta t$. The switching point t2 is selected to occur when the value of T is equal to the delay of the desired output signal with respect to the undelayed input signal, at which point the undelayed signal becomes its source instead of the delayed signal. The technique operates to provide an adjustable average phase of the output signals over the period of the counter 551.

The C/A Code and P-Code Processors

Figure 11:
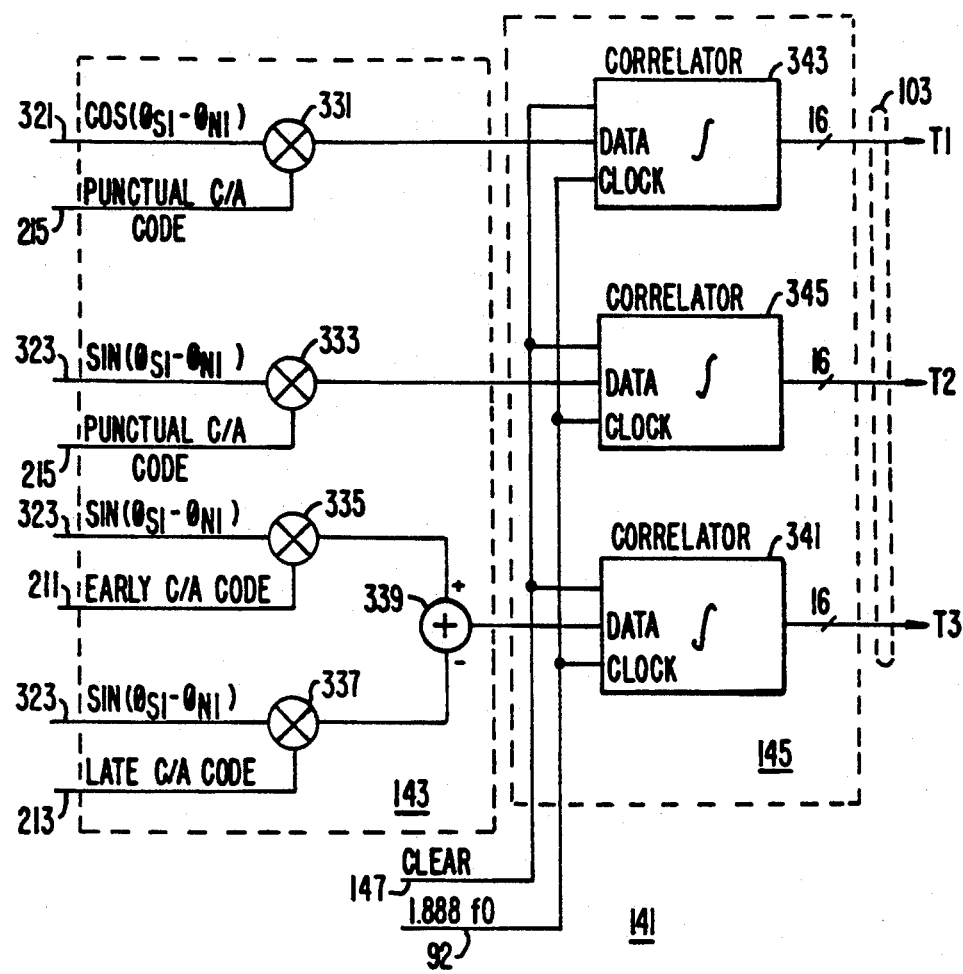
FIG. 11 provides details of the C/A-code processing block of the digital channel processor as illustrated in FIGS. 4 and 5.

The C/A-code processor 141 of FIG. 5, shown in its components 143 and 145 in the simplified diagram of FIG. 4, is shown in more detail in FIG. 11. The mixing stage 143 has as a purpose to mix off the C/A-code on the L1 signal and the correlators 145 have as a purpose to provide signals to indicate when the locally generated C/A-code signal is in phase with that on a received L1 signal being processed. Within the mixing stage 143 are individual mixing circuits 331 and 333 that provide outputs to respective correlator circuits 343 and 345. The circuits 331 and 333 mix off the nominal C/A-code of each of the signals in lines 321 and 323 from the previous mixing stage 115. Another mixing stage 335 mixes off the early C/A-code from the signal in line 323, and the mixer 337 mixes off the late C/A-code from the signal in the line 323. The outputs of the mixers 335 and 337 are combined by an adding circuit 339, its output being applied to a correlator 341.

It can be seen that the integration performed by the correlators 343 and 345 minimizes the T1 signal, maximizes the T2 signal, and minimizes the T3 signal when the locally generated C/A-code is in phase with that of the satellite signal being tracked. This is then used by the microprocessor system 41 to control the phase of the C/A-code generator 21 to bring about such an alignment. The correlators 343, 345 and 341 operate to integrate their respective inputs over the same time period controlled by the Clear timing signal in line 147.

Referring to FIG. 17, an implementation of the P(Y) code processing circuits 185 of FIGS. 4 and 5 is given in some detail. The mixers 127 and 129 of FIG. 4 are shown in expanded detail in FIG. 11, as are the primary accumulating circuits 151 and 155. The mixing circuit 127 has as a primary function to mix off of the L1 signal output of the prior mixer 115 the L1 P-code signal. The mixing circuit 127 includes four individual mixers 351, 353, 355, and 357, connected as indicated in FIG. 17. An addition circuit 359 is also included. The primary function of the mixing circuits 129 is to mix off the P-code from the L2 signal output of the mixer 121. The mixing circuit 129 is generally of the same structure as that of the circuit 127, but is connected to corresponding L2 signals rather than L1 signals.

The primary accumulators 151 of FIG. 4 include three individual accumulator circuits 361, 363 and 365 of FIG. 17 which function to integrate, over periods between Edge 1 pulses in line 153, the respective outputs of the mixer 351, mixer 353 and addition circuit 359. Similarly, the primary accumulators 155 of FIG. 4 include three individual accumulator circuits 367, 369 and 371 of FIG. 17 which integrate their respective inputs over time periods between Edge 2 pulses in line 157. The structure of each of the six accumulator circuits so shown in FIG. 17 is given in FIG. 18.

A second portion of the P(Y)-code processing circuits 185 of FIG. 5, functionally shown within dotted outline 187 of FIG. 4, is also given in FIG. 17. Six identical summation circuits 401, 403, 405, 407, 409 and 411 receive the outputs of the primary accumulators 361–371 in the specific combinations shown. The circuit structure of each of these summation circuits is given in FIG. 19. After correlating with the appropriate code and carrier replicas, the noise components which affect the observable outputs are zero mean; therefore, the time average of the observable outputs R0–R5 are given by the following expressions:

$$<R0> \propto \int P1(t) \cdot \hat{P}1(t-\tau_1) \cdot \sin(\phi_{S1} - \phi_{N1}) \cdot A_{L1} \cdot \hat{A}_{L2} \, dt$$

$$<R1> \propto \int P1(t) \cdot \hat{P}1(t-\tau_1) \cdot \cos(\phi_{S1} - \phi_{N1}) \cdot A_{L1} \cdot \hat{A}_{L2} \, dt$$

$$<R2> \propto \int (P1(t) \cdot \hat{E}1(t-\tau_1) - P1(t) \cdot \hat{L}1(t-\tau_1)) \cdot \cos(\phi_{S1} - \phi_{N1}) \cdot A_{L1} \cdot \hat{A}_{L2} \, dt$$

$$<R3> \propto \int P2(t) \cdot \hat{P}2(t-\tau_2) \cdot \sin(\phi_{S2} - \phi_{N2}) \cdot \hat{A}_{L2} \cdot A_{L1} \, dt$$

$$<R4> \propto \int P2(t) \cdot \hat{P}2(t-\tau_2) \cdot \cos(\phi_{S2} - \phi_{N2}) \cdot A_{L2} \cdot \hat{A}_{L1} \, dt$$

$$<R2> \propto \int (P2(t) \cdot \hat{E}2(t-\tau_2) - P2(t) \cdot \hat{L}2(t-\tau_2)) \cdot \cos(\phi_{S2} - \phi_{N2}) \cdot A_{L2} \cdot \hat{A}_{L1} \, dt$$

where:

$A_{L1}$ = Anti-Spoof bit modulating L1 P-code;
$A_{L2}$ = Anti-Spoof bit modulating L2 P-code;
$\hat{A}_{L1}$ = estimate of Anti-Spoof bit modulating L1 P-code (line 163);
$\hat{A}_{L2}$ = estimate of Anti-Spoof bit modulating L2 P-code (line 167);
$\hat{E}1$ = early estimate of received L1 P-code (line 233);
$\hat{E}2$ = early estimate of received L2 P-code (line 239);
$\hat{L}1$ = late estimate of received L1 P-code (line 235);
$\hat{L}2$ = late estimate of received L2 P-code (line 241);
P1 = received L1 P-code;
P2 = received L2 P-code;
$\hat{P}1$ = punctual estimate of received L1 P-code (line 231);
$\hat{P}2$ = punctual estimate of received L2 P-code (line 237);
$\phi_N$ = NCO 305 phase;
$\phi_S$ = satellite carrier phase;
$\tau_1$ = L1 P-code phase offset;
$\tau_2$ = L2 P-code phase offset; and
< > denotes time average.

The integration periods of each of the summation circuits 401–411, as indicated by the above expressions, are intervals between successive clear pulses in the control line 147. That is, the integration period is the one millisecond repetition period of the C/A-code epoch. Integration is performed in the microprocessor system 41 over a period of 100 milliseconds.

Carrier and Code Loop Locking Processing

Figure 20:
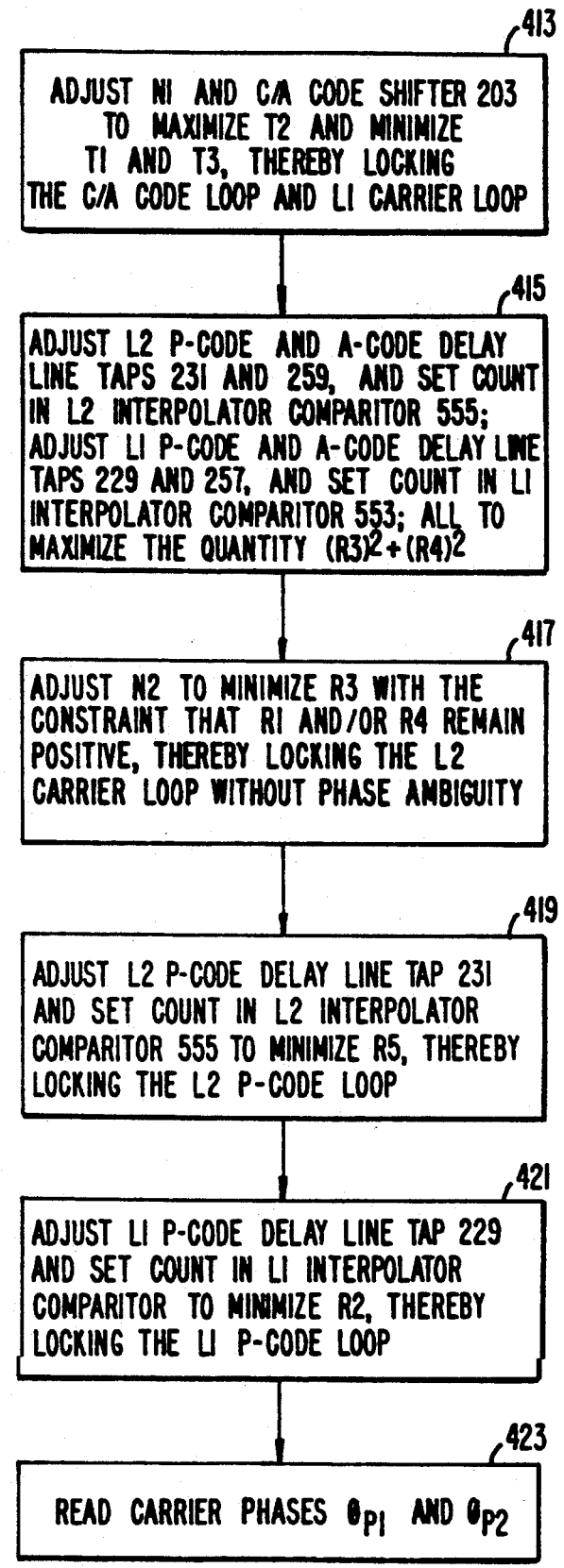

Referring to FIG. 20, a preferred technique is outlined for adjusting and locking the carrier and code generators into phase with the carriers and code of the satellite signals being processed. In a first step 413, the numerically controlled oscillator "N1" 305 in the L1 carrier 107, and the C/A-shifter 203, are adjusted in order to maximize the signal T2 and minimize the signals T1 and T3 from the C/A-code processor 141. When this occurs, the nominal C/A-code in line 215 is then known to be in phase with that of the L1 signal being processed. This provides an unambiguous reference for the L1 C/A-code carrier, and thus also for the L1 P-code carrier that is displaced ninety degrees from it. When the L1 carrier loop is thus locked, the quantity $(\phi_{S1} - \phi_{N1})$ of the equations given above, which represents the phase difference between the L1 carrier and the L1 NCO, is approximately equal to zero.

A next step 415 is for the microprocessor to adjust the L1 and L2 P-code delay line taps 229 and 231 (FIG. 6) and load the L1 and L2 comparators 553 and 555 of the interpolator 230 (FIG. 15) in order to maximize the quantities $(R3)^2 + (R4)^2$. As previously discussed, adjustment of the P-code delay line 227 causes a corresponding adjustment of the L2 tap 259 of the A-code rate delay line 255. This adjustment approximates synchronization of the locally generated P-code with that of the signals being received and processed. The locally generated P-code signals are not yet locked in phase with those of the received signals but are close enough to being in phase so that the L2 carrier loop can be locked.

Since the value of the received A-code bit is unknown, there exists a phase ambiguity in the L2 carrier because this A-code bit modulates the phase of the L2 carrier. However, the A-code bit affects both the L1 and L2 signals, and the phase of the L1 carrier is known because it is determined when tracking the C/A-code. This allows determination of the phase of the L2 carrier without ambiguity. Therefore a next step 417 adjusts the numerically controlled oscillator "N2" 305 of the L2 carrier generator 109 in order to minimize the R3 output of the secondary accumulators while maintaining R1 and/or R4 positive. Once this is accomplished, the locally generated L2 carrier is locked in phase with that of the satellite signal being received, without a one-half L2 carrier cycle ambiguity that is characteristic of prior art techniques. When the L2 carrier loop is thus locked, the quantity $(\phi_{S2} - \phi_{N2})$ of the equations given above is approximately equal to zero. The phase "$\phi_{P2}$" output in line 125 of FIGS. 4 and 5 then provides that relative phase quantity.

In a step 419, the L2 P-code delay line tap 231 (FIG. 6) is again adjusted, and the count set in the L2 comparator 555 (FIG. 15) of the interpolator selected, in order to minimize the signal level R5. Once this is accomplished, the punctual L2 P-code signal in line 237 is then phase locked with the P-code received on the L2 signal being processed.

Similarly, in a next step 421, the L1 P-code delay line tap 229 (FIG. 6) and the count set in the L1 comparator 553 (FIG. 15) of the interpolator are adjusted to minimized the quantity R2. When this is accomplished, the L1 punctual P-code signal in line 231 is in phase with that being received on the L1 signal being processed.

Being able to lock the P-code loops on both the L1 and L2 signals, even when modulated by the A-code, is a significant advance. Being able to demodulate the signal with these P-code replicas is of considerable advantage. Not only can the carrier phases $\phi_{P1}$ and $\phi_{P2}$, indicated in a step 423, be determined with more precision, the ability to provide the L1 and L2 signal P-code relative phases is also of considerable utility.

It will be noted that the selection of the quantities R0–R5 expressed above and the technique of locking the code and carrier loops overcomes a potential error in determining the carrier phases. Each of the carrier loops can be locked by adjusting the phase of their respective NCOs 305 (FIG. 10) to either of two relative phases that are 180 degrees apart. That is, there are two values of relative phase which can be loaded into the NCOs 305 of each of the carrier generators 107 and 109 (FIG. 5) that will lock their respective loops but only one of these values is in phase with their respective L1 and L2 signal carriers and the other value is out of phase by 180 degrees. By first locking onto the L1 signal C/A-code, in step 413, which is not affected by the unknown A-code, the L1 signal C/A-code carrier is known without uncertainty. The L1 signal P-code phase is then also known with certainty, since it differs therefrom by ninety degrees. The A-code estimate $\hat{A}_{L1}$ derived from the L1 signal is also then known to have the correct sign. Therefore, adjustment of the various parameters to minimize the quantity R3 in the step 417 (FIG. 20) will result in $\phi_{N2}$ substantially equaling $\phi_{S2}$ without ambiguity or uncertainty. The phase values $\phi_{P1}$ and $\phi_{P2}$ are then similarly certain and unambiguous.

Although the above method works when the telemetry data on the L2 signal is present, it is possible to multiply the values of R0–R6 by the sign of the received telemetry bit extracted from the C/A-code to allow operation when the data stream on the L2 carrier is turned off.

Although the various aspects of the present invention have been described as implemented in a preferred embodiment, it will be understood that the invention is entitled to protection within the full scope of the appended claims.

It is claimed:

1. A system for processing L1 and L2 signals received from a satellite that include a unique frequency carrier with a known pseudo-random P-code and an unknown code modulated thereon, comprising:

means for generating replicas of the respective unique frequency carriers of the received L1 and L2 signals, means for generating a replica of the known pseudo-random P-code modulated on the received L1 and L2 signals, means receiving the L1 and L2 signals for demodulating the L1 and L2 signals with the replicas of their carriers provided by the carrier replica generating means and with the P-code replica provided by the P-code replica generating means, thereby producing demodulated L1 and L2 signals, means receiving the demodulated L1 and L2 signals for separately integrating them over time periods equal in length to a plurality of P-code cycles, thereby producing integrated demodulated L1 and L2 signals, means receiving the integrated demodulated L1 and L2 signals for correlating them with each other, thereby generating a correlation level, and means communicating with said carrier replica generating means and said P-code replica generating means for adjusting the phases of the carrier replicas and of the P-code replica relative to the incoming L1 and L2 signals in a manner to substantially maximize a measure of said correlation level, whereby useful phases of the carrier and P-code replicas are obtained.

2. The system of claim 1 wherein the integrating means includes means for integrating the demodulated L1 and L2 signals over a time period equal to approximately twenty P-code cycles.

3. The system of claim 1 wherein the integrating means includes means for integrating the demodulated L1 and L2 signals over a time period substantially equal to a period of the unknown modulation code.

4. The system of claim 1 wherein the demodulating means includes:

a first delay line having a plurality of taps therealong, means communicating with the P-code replica generating means for applying the P-code replica to said first delay line, thereby making the P-code replica available at different relative phases at the plurality of first delay line taps, and means receiving the P-code replica from said first delay line taps for adjusting the relative phases of the P-code replica used to separately demodulate each of the received L1 and L2 signals, whereby the generation of only one P-code replica is required in order to demodulate both of the L1 and L2 signals.

5. The system of claim 4 wherein the phase adjusting means includes means for selecting the taps of the first delay line from which the P-code is obtained for use in demodulating each of the L1 and L2 signals.

6. The system of claim 4 wherein the integrating means includes:

a second delay line having a plurality of taps, means for generating a timing signal in phase with the generated P-code replica, means communicating with the timing signal generating means for applying the timing signal to the second delay line, thereby making the timing signal available at different relative phases thereof at the plurality of second delay line taps, and means receiving the timing signal from the second delay line taps for adjusting the relative phases the repetitive periods of integration of the demodulated L1 and L2 signals.

7. The system of claim 6 wherein the phase adjusting means in each of the demodulating and integrating means includes means for adjusting in synchronism the taps of both the first and second delay lines from which the P-code and integrating period timing signals are respectively obtained for each of the L1 and L2 signals.

8. A system for generating a desired binary signal shifted in phase a controlled amount from a source binary signal formed from a first periodic clock signal having a first period, comprising:

means for generating from said source binary signal a replica thereof that is delayed an integral number of said first clock signal periods, means for generating a second periodic clock signal having a second period that is slightly different from said first period, said first and second clock signals being synchronous with each other, means for comparing said first and second clock signals to determine periodically recurring instances of substantial coincidence therebetween and generating a pulse thereat, means for resetting by said coincidence pulse a counter being clocked with said second clock signal, means receiving said source and delayed signals for generating the desired binary signal in respective alternating first and second durations, said first duration beginning at the coincidence pulse and continuing until said counter reaches a predetermined count and said second duration extending from said counter reaching said predetermined count until the occurrence of another coincidence pulse, and means for setting the predetermined count of said counter to obtain the desired signal having a desired phase relative to said source signal.

9. A system for processing L1 and L2 satellite signals that include a unique frequency carrier with a known pseudo-random P-code and an unknown code modulated thereon, comprising:

means for deriving from the L1 satellite signal a signal that represents an estimate of the unknown code, and means receiving the unknown code estimate for combining the estimate signal with the L2 signal in a manner to determine the relative phase of the L2 signal.

10. A system for processing L1 and L2 signals received from at least one satellite of a global positioning system wherein each of said signals includes a unique frequency carrier with a known pseudo-random P-code modulated thereon, comprising:

means receiving the L1 and L2 signals for generating a single replica of the known P-code contained therein, a delay line having a plurality of taps, means for applying the single P-code replica to said delay line in a manner that the P-code replica is available at the plurality of delay line taps with different relative phases thereof, and means for obtaining the single generated P-code replica from two different taps of the delay line, thereby to make the P-code replica available at two different relative phases.

11. A system for processing L1 and L2 signals received from a satellite that include a unique frequency carrier with a known pseudo-random P-code and an unknown code modulated thereon, comprising:

means for generating replicas of the known pseudo-random P-code modulated on the received L1 and L2 signals, means receiving the L1 and L2 signals for demodulating the L1 and L2 signals with the P-code replicas provided by the P-code replica generating means, thereby producing demodulated L1 and L2 signals, means receiving the demodulated L1 and L2 signals for separately integrating them over time periods equal in length to a plurality of P-code cycles, thereby producing integrated demodulated L1 and L2 signals, means receiving the integrated demodulated L1 and L2 signals for combining them with each other, thereby generating at least one combined signal, and means communicating with said P-code replica generating means for adjusting the phases of the P-code replicas relative to the incoming L1 and L2 signals until a certain characteristic of said at least one combined signal is obtained that corresponds to a condition when the P-code replicas are substantially aligned in phase with the P-code modulated on the respective received L1 and L2 signals, whereby useful phases of the P-code replicas are obtained.

12. The system of claim 11 wherein the integrating means includes means for integrating the demodulated L1 and L2 signals over a time period equal to approximately twenty P-code cycles.

13. The system of claim 11 wherein the integrating means includes means for integrating the demodulated L1 and L2 signals over a time period substantially equal to a period of the unknown modulation code.

14. The system of claim 11 wherein said means for generating P-code replicas includes:

means for generating a single pseudo-random P-code signal, and means receiving said single P-code signal for generating said P-code replicas with individually adjustable relative phases.

15. A method of processing L1 and L2 signals received from at least one satellite of a global positioning system wherein each of said signals includes a unique frequency carrier with a known pseudo-random P-code and an unknown code modulated thereon, comprising the steps of:

demodulating each of the received L1 and L2 signals with locally generated replicas of the known P-code that is contained therein, combining a result of the demodulation step from each of the L1 and L2 signal paths with the demodulated signal of the other of the L1 and L2 signal paths, and adjusting the phases of the locally generated P-code replicas relative to the incoming L1 and L2 signals until a given characteristic of the combined L1 and L2 signals is obtained that indicates the locally generated P-code signals are substantially aligned in phase with the P-code components of the received L1 and L2 signals, whereby the resulting locally generated P-code phases are useable to determine information of the location of the receiving position.

16. The method of claim 15 wherein the phase adjusting step includes maximizing power of the combined L1 and L2 signals as said given characteristic.

17. The method of claim 15 wherein:

the demodulating step additionally includes the step of demodulating each of the received L1 and L2 signals with locally generated replicas of their respective carrier signals, and the phase adjusting step additionally includes the step of adjusting the phases of the locally generated carrier signal replicas until the desired characteristic of the combined L1 and L2 signals is obtained, whereby the resulting locally generated carrier replicas are useable to determine information of the location of the receiving position.

18. The method of claim 15 wherein
the demodulating step further includes the step of locally generating the P-code replicas by use of an early/late phase circuit, and
the phase adjusting step further includes minimizing power of a correlation of signals from said early/late circuit as said given characteristic.

19. The method of claim 16 wherein the demodulating step includes the step of locally generating from a single P-code generator separate phase adjusted replicas of the P-code contained in each of the received L1 and L2 signals.

20. The method of claim 15 wherein the received L1 signal additionally contains a known C/A-code modulated on its L1 carrier in phase quadrature with the P-code modulated thereon, the phase adjusting step including the initial steps of locally generating a replica of the C/A-code that is modulated on the received L1 signal and adjusting the relative phase of the locally generated C/A-code replica until it is locked in phase with that on the received L1 signal.

21. A method of processing L1 and L2 signals received from at least one satellite of a global positioning system wherein each of said signals includes a unique frequency carrier with a known pseudo-random P-code and an unknown code modulated thereon, comprising the steps of:
demodulating each of the received L1 and L2 signals with a locally generated replica of the known P-code that is contained therein,
repetitively and separately integrating the demodulated L1 and L2 signals over time periods equal in length to a plurality of P-code cycles,
combining a result of the integration step from each of the L1 and L2 signal paths with the integrated signal of the other of the L1 and L2 signal paths, and
adjusting the phases of the locally generated P-code replicas relative to the incoming L1 and L2 signals until a given characteristic of the combined L1 and L2 signals is obtained that indicates the locally generated P-code signals are substantially aligned in phase with the P-code components of the received L1 and L2 signals, whereby the resulting locally generated P-code phases are useable to determine information of the location of the receiving position.

22. The method of claim 21 wherein the phase adjusting step includes maximizing power of the combined L1 and L2 signals as said given characteristic.

23. The method of claim 21 wherein:
the demodulating step additionally includes the step of demodulating each of the received L1 and L2 signals with locally generated replicas of their respective carrier signals, and
the phase adjusting step additionally includes the step of adjusting the phases of the locally generated carrier signal replicas until the desired characteristic of the combined L1 and L2 signals is obtained, whereby the resulting locally generated carrier replicas are useable to determine information of the location of the receiving position.

24. The method of claim 21 wherein
the demodulating step further includes the step of locally generating the P-code replicas by use of an early/late phase circuit, and
the phase adjusting step further includes minimizing power of a correlation of signals from said early/late circuit as said given characteristic.

25. The method of claim 21 wherein the demodulating step includes the step of locally generating from a single P-code generator separate phase adjusted replicas of the P-code contained in each of the received L1 and L2 signals.

26. The method of claim 21 wherein the received L1 signal additionally contains a known C/A-code modulated on its L1 carrier in phase quadrature with the P-code modulated thereon, the phase adjusting step including the initial steps of locally generating a replica of the C/A-code that is modulated on the received L1 signal and adjusting the relative phase of the locally generated C/A-code replica until it is locked in phase with that on the received L1 signal.

27. The method of claim 21 wherein the integrating step includes performing such integration over time periods each equal to approximately twenty P-code cycles.

28. The method of claim 21 wherein the integration step includes performing such integration over time periods substantially equal to that of the unknown modulation code.

29. The method of claim 21 wherein the integration step includes performing the integration over time periods locked in phase with said P-code.

30. A method of processing L1 and L2 signals received from at least one satellite of a global positioning system wherein each of said signals includes a unique frequency carrier with a known pseudo-random P-code and an unknown code modulated thereon, comprising the steps of:
locally generating replicas of the known P-codes included in the L1 and L2 signals,
demodulating the received L1 signal with the locally generated L1 signal P-code replica, thereby obtaining a demodulated L1 signal,
combining together the L2 signal, the locally generated L2 signal P-code replica and the demodulated L1 signal, thereby obtaining a combined signal, and
adjusting the phase of the locally generated L2 and P-code replica relative to the incoming L2 signal until a given characteristic of the combined signal is obtained that indicates the locally generated L2 signal P-code replica is substantially aligned in phase with the P-code component of the received L2 signal, whereby the phase of the L2 signal P-code component is determined from the phase of the locally generated L2 signal P-code replica even though the unknown code is also modulated onto the L2 signal carrier.

31. The method of claim 30 wherein the combining step includes the step of repetitively integrating the demodulated L1 signal over time periods equal in length to a plurality of P-code cycles.

32. The method of claim 31 wherein the integrating step includes performing such integration over time periods each equal to approximately twenty L1 signal P-code cycles.

33. The method of claim 30 wherein the phase adjusting step includes maximizing the power of the combined signal as said given characteristic.

34. The method of claim 30 wherein the demodulating step further includes the step of locally generating the L1 signal P-code replica by use of an early/late phase circuit, and the phase adjusting step further includes minimizing power of a correlation of signals from said early/late circuit as said given characteristic.

35. The method of claim 30 wherein the received L1 signal additionally contains a known C/A-code modulated on its L1 carrier in phase quadrature with the P-code modulated thereon, the phase adjusting step including the initial steps of locally generating a replica of the C/A-code that is modulated on the received L1 signal and adjusting the relative phase of the locally generated C/A-code replica until it is locked in phase with that on the received L1 signal.

36. The method of claim 30 wherein the combining step includes the steps of first combining together the L2 signal and the locally generated L2 signal P-code replica, thereby obtaining a demodulated L2 signal, and then combining the demodulated L1 and demodulated L2 signals.

37. A method of processing L1 and L2 signals received from at least one satellite of a global positioning system wherein each of said signals includes a unique frequency carrier with a known pseudo-random P-code and an unknown code modulated thereon, comprising the steps of:

locally generating replicas of the known P-codes included in the L1 and L2 signals, demodulating the received L2 signal with the locally generated L2 signal P-code replica, thereby obtaining a demodulated L2 signal, combining together the L1 signal, the locally generated L1 signal P-code replica and the demodulated L2 signal, thereby obtaining a combined signal, and adjusting the phase of the locally generated L2 signal P-code replica relative to the incoming L2 signal until a given characteristic of the combined signal is obtained that indicates the locally generated L2 signal P-code replica is substantially aligned in phase with the P-code component of the received L2 signal, whereby the phase of the L2 signal P-code component is determined from the phase of the locally generated L2 signal P-code replica even though the unknown code is also modulated onto the L2 signal carrier.

38. The method of claim 37 wherein the combining step includes the step of repetitively integrating the demodulated L2 signal over time periods equal in length to a plurality of P-code cycles.

39. The method of claim 38 wherein the integrating step includes performing such integration over time periods each equal to approximately twenty L2 signal P-code cycles.

40. The method of claim 37 wherein the phase adjusting step includes maximizing the power of the combined signal as said given characteristic.

41. The method of claim 37 wherein
the demodulating step further includes the step of locally generating the L2 signal P-code replica by use of an early/late phase circuit, and the phase adjusting step further includes minimizing power of a correlation of signals from said early/late circuit as said given characteristic.

42. The method of claim 37 wherein the received L1 signal additionally contains a known C/A-code modulated on its L1 carrier in phase quadrature with the P-code modulated thereon, the phase adjusting step including the initial steps of locally generating a replica of the C/A-code that is modulated on the received L1 signal and adjusting the relative phase of the locally generated C/A-code replica until it is locked in phase with that on the received L1 signal.

43. The method of claim 37 wherein the combining step includes the steps of first combining together the L1 signal and the locally generated L1 signal P-code replica, thereby obtaining a demodulated L1 signal, and then combining the demodulated L1 and demodulated L2 signals.

44. A method of processing L1 and L2 signals received from at least one satellite of a global positioning system wherein each of said signals includes a unique frequency carrier with a known pseudo-random P-code and an unknown code modulated thereon, comprising the steps of:

deriving from the received L2 signal a signal that represents an estimate of the unknown code, and combining the estimate signal with the received L1 signal in a manner to determine the relative phase of the L1 signal.

* * * * *